(12) United States Patent
Jang et al.

(10) Patent No.: US 11,475,891 B2
(45) Date of Patent: Oct. 18, 2022

(54) LOW DELAY VOICE PROCESSING SYSTEM

(71) Applicant: LG ELECTRONICS INC., Seoul (KR)

(72) Inventors: Soonpil Jang, Seoul (KR); Seongjae Jeong, Seoul (KR); Wonkyum Kim, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/077,943

(22) Filed: Oct. 22, 2020

(65) Prior Publication Data

US 2021/0241762 A1    Aug. 5, 2021

(30) Foreign Application Priority Data

Feb. 4, 2020    (KR) .................. 10-2020-0012957

(51) Int. Cl.
| | |
|---|---|
| *G10L 15/22* | (2006.01) |
| *G10L 15/26* | (2006.01) |
| *H04R 29/00* | (2006.01) |
| *G10L 15/18* | (2013.01) |
| *G10L 15/08* | (2006.01) |

(52) U.S. Cl.
CPC .......... *G10L 15/22* (2013.01); *G10L 15/1822* (2013.01); *G10L 15/26* (2013.01); *H04R 29/004* (2013.01); *G10L 2015/088* (2013.01); *G10L 2015/223* (2013.01)

(58) Field of Classification Search
CPC ..... G10L 15/22; G10L 15/1822; G10L 15/26; H04R 29/004
See application file for complete search history.

(56) References Cited

FOREIGN PATENT DOCUMENTS

JP    2017032738 A  *  2/2017

OTHER PUBLICATIONS

JP2017032738A—translation (Year: 2017).*

* cited by examiner

*Primary Examiner* — Michelle M Koeth
*Assistant Examiner* — Darioush Agahi
(74) *Attorney, Agent, or Firm* — Lee, Hong, Degerman, Kang & Waimey PC

(57) ABSTRACT

Disclosed is a speech processing method. The speech processing method controls activation timing of a microphone based on a response pattern of the microphone from a user in order to implement a natural conversation. The speech processing device and the NLP system of the present disclosure may be associated with an artificial intelligence module, a drone (or unmanned aerial vehicle (UAV)), a robot, an augmented reality (AR) device, a virtual reality (VR) device, a device related to 5G service, etc.

16 Claims, 19 Drawing Sheets

LOW DELAY VOICE PROCESSING SYSTEM

Pursuant to 35 U.S.C. § 119(a), this application claims the benefit of earlier filing date and right of priority to Korean Patent Application No. 10-2020-0012957, filed on Feb. 4, 2020, the contents of which are hereby incorporated by reference herein in its entirety.

BACKGROUND OF THE INVENTION

Field of the invention

The present disclosure relates to a low delay voice processing system.

Related Art

Machine learning(e.g., deep learning) is an algorithm technique that it itself may classify and learn the features of input data.

The component technology is a technique for mimicking the human brain's perception and decision capabilities using a machine learning algorithm, and this may be divided into several technical fields, such as linguistic understanding, visual understanding, inference/prediction, knowledge expression, and operation control.

A voice recognition system has a problem in that it allows only an unnatural conversation unlike a dialogue method between persons because it can receive and recognize a counterpart's utterance after an utterance of a user or the voice recognition system is terminated.

SUMMARY OF THE INVENTION

The present disclosure is directed to solving the aforementioned need and/or problem. Furthermore, the present disclosure is directed to implementing a low delay voice processing system which allows a natural conversation between a machine and a person.

Furthermore, the present disclosure is directed to implementing a voice processing system capable of inferring a utterance intent in parallel with respect to one utterance.

In an aspect, a speech processing method includes generating information on activation timing of a microphone for receiving a response to a first utterance, tagging the information on the activation timing on the first utterance, and generating a signal for activating the microphone in response to an event when the event reaching the activation timing is detected while the first utterance is provided.

Furthermore, the speech processing method may further include providing the first utterance. Providing the first utterance may include transmitting audio or text related to the first utterance to an external terminal including a speaker or a display.

Furthermore, the speech processing method may further include controlling a transceiver to transmit the signal for activating the microphone to the external terminal.

Furthermore, the first utterance may include i. a first informing utterance including guide information for multiple services stored in a memory, and ii. a second informing utterance generated by a generative model for generating the first utterance.

Furthermore, generating the information on the activation timing may include extracting an embedding vector related to the first utterance, and generating the information on the activation timing by applying the embedding vector to a pre-trained neural network model and determining the activation timing of the microphone corresponding to the first utterance based on an output of the neural network model.

Furthermore, the neural network model may be a neural network model pre-trained based on log data, which is related to the embedding vector related to the first utterance and timing at which the response to the first utterance is received in a total output time of the first utterance.

Furthermore, the speech processing method may further include receiving a second utterance through the activated microphone and generating a response to the second utterance by extracting at least one of intent or the entity of the second utterance.

Furthermore, the speech processing method may further include providing the response to the second utterance. Providing the response may include transmitting, to an external terminal including a speaker or a display, audio or text related to the response.

Furthermore, generating the response may include splitting the second utterance into N (N is a natural number) sub-sections, extracting at least one of the intent or the entity from a first extraction section including first to M-th sub-sections (M is a natural number, M<N) among the N sub-sections, and generating the response to the second utterance based on the intent or the entity.

Furthermore, when reliability of the extracted intent is less than a preset reference value, generating the response may further include extracting at least one of the intent or the entity from a second extraction section including the first sub-section to a P-th sub-section (P is a natural number, M<P≤N) among the N sub-sections, and terminating a natural language understanding (NLU) process when reliability of the intent extracted from the second extraction section is the preset reference value or more. The response to the second utterance may be a response generated based on the intent or entity extracted from the second extraction section.

Furthermore, when the reliability of the extracted intent is less than the preset reference value, generating the response may include extracting at least one of the intent or the entity from a third extraction section including the first to K-th sub-sections (K is a natural number, M<K≤N) among the N sub-sections. The K to determine a range of the third extraction section may be increased by 1 whenever reliability of the intent extracted from the third extraction section exceeds the preset reference value.

Furthermore, the speech processing method may further include controlling a transceiver to transmit the response to the second utterance to an external terminal including a speaker or a display.

In an aspect, a speech processing device includes a memory storing multiple first utterances and a processor configured to generate information on activation timing of a microphone for receiving a response to a first utterance, tag the information on the activation timing on the first utterance, and generate a signal for activating the microphone in response to an event when the event reaching the activation timing is detected while the first utterance is provided.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5 G Network

Figure 1:
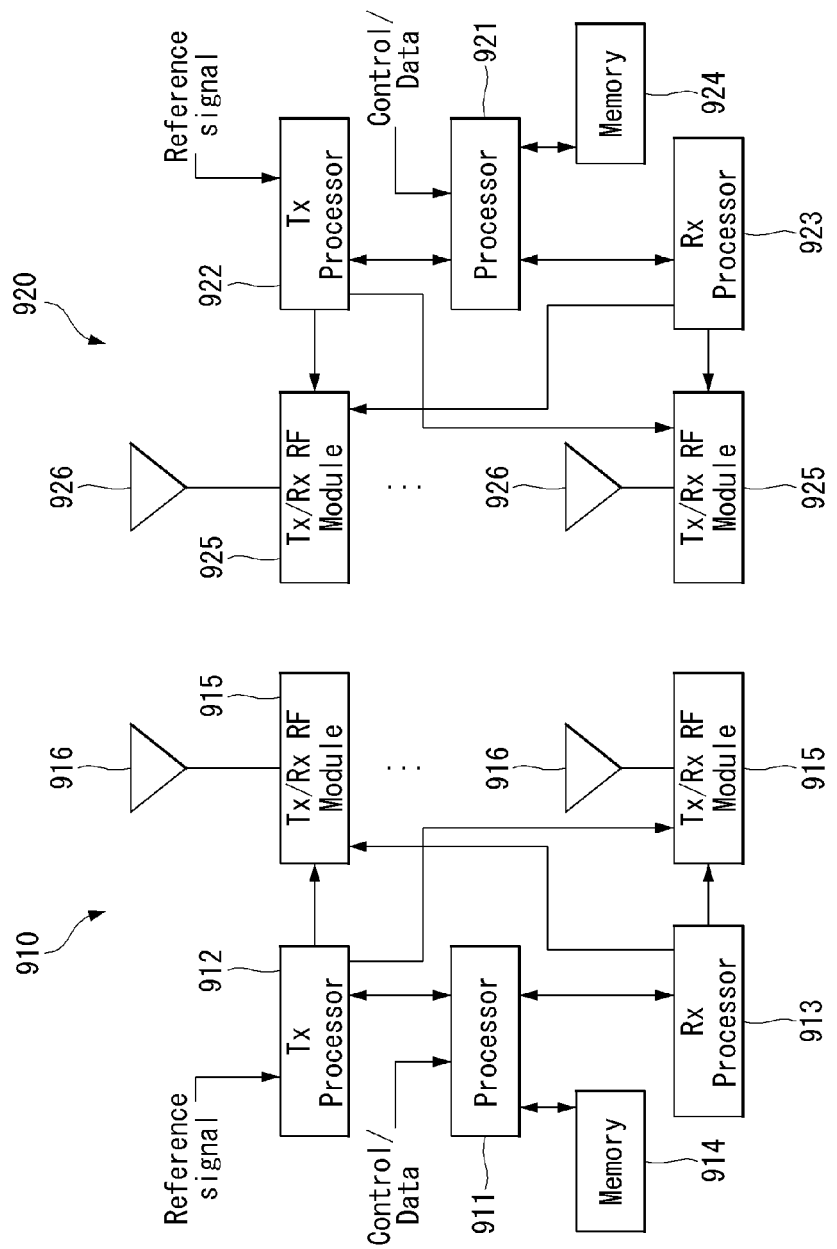
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operaion.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
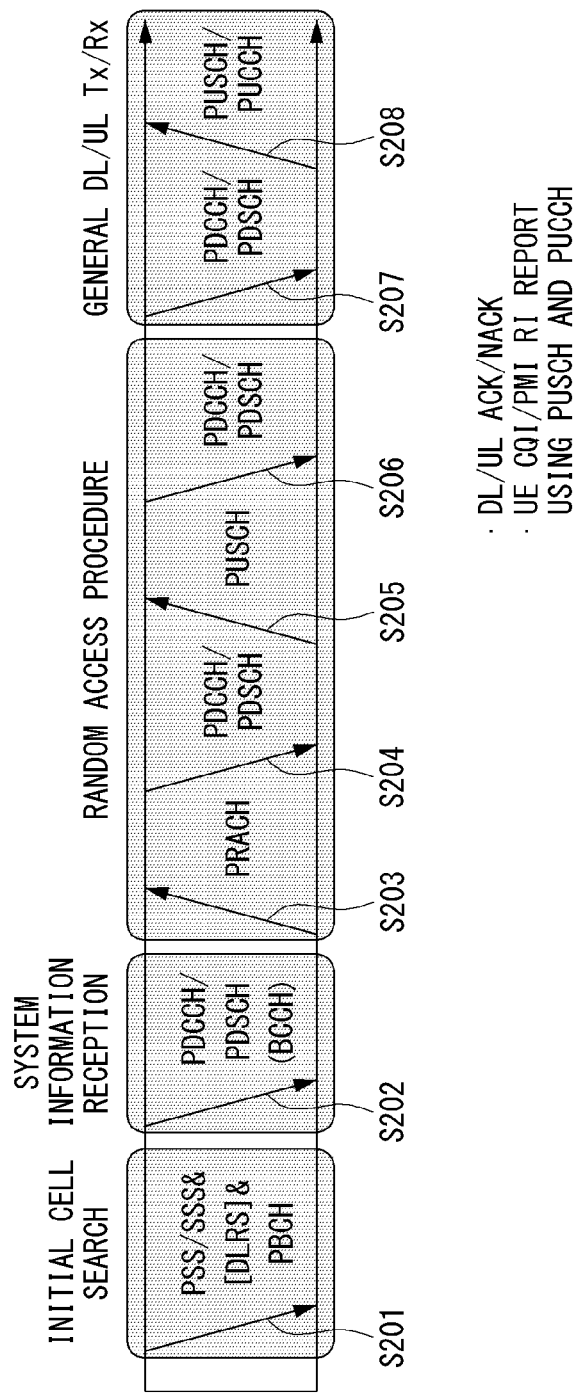
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between User Equipments Using 5G Communication

Figure 3:
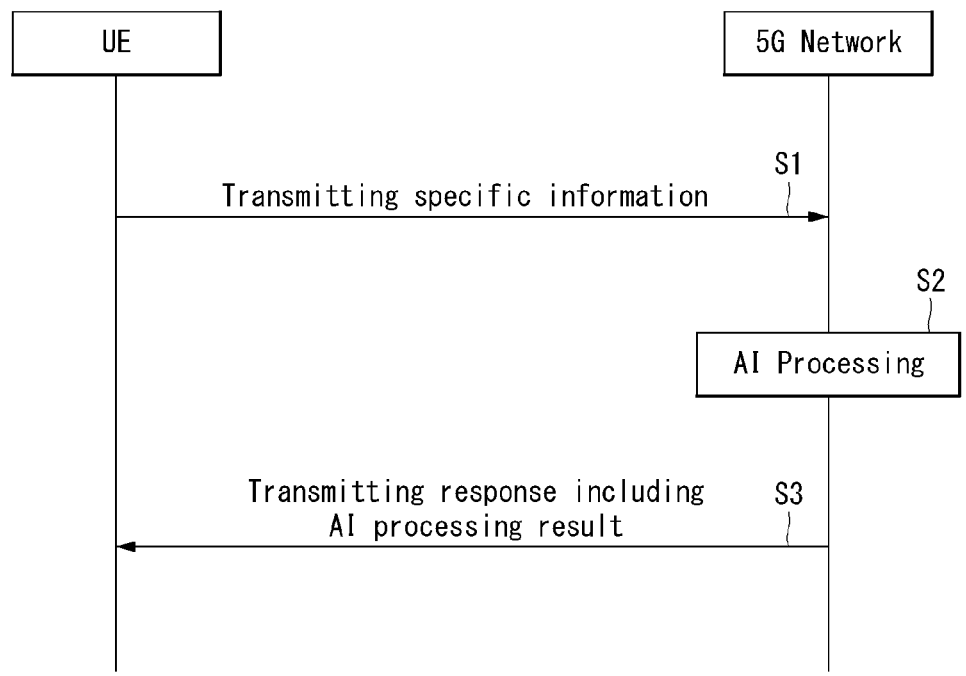
FIG. 3 shows an example of basic operations of an autonomous vehicle and a 5G network in a 5G communication system.

FIG. 3 shows an example of basic operations of a user equipment and a 5G network in a 5G communication system.

The user equipment transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the user equipment (S3).

G. Applied Operations Between User Equipment and 5 G Network in 5G Communication System Hereinafter, the operation of a user equipment using 5 G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5 G communication are applied will be described.

As in steps S1 and S3 of FIG. 3, the user equipment performs an initial access procedure and a random access procedure with the 5 G network prior to step S1 of FIG. 3 in order to transmit/receive signals, information and the like to/from the 5 G network.

More specifically, the user equipment performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the user equipment receives a signal from the 5 G network.

In addition, the user equipment performs a random access procedure with the 5G network for UL synchronization acquisition and/or UL transmission. The 5G network can transmit, to the user equipment, a UL grant for scheduling transmission of specific information. Accordingly, the user equipment transmits the specific information to the 5G network on the basis of the UL grant. In addition, the 5G network transmits, to the user equipment, a DL grant for scheduling transmission of 5G processing results with respect to the specific information. Accordingly, the 5G network can transmit, to the user equipment, information (or a signal) related to remote control on the basis of the DL grant.

Next, a basic procedure of an applied operation to which a method proposed by the present invention which will be described later and URLLC of 5G communication are applied will be described.

As described above, a user equipment can receive DownlinkPreemption IE from the 5G network after the user equipment performs an initial access procedure and/or a random access procedure with the 5G network. Then, the user equipment receives DCI format 2_1 including a preemption indication from the 5G network on the basis of DownlinkPreemption IE. The user equipment does not perform (or expect or assume) reception of eMBB data in resources (PRBs and/or OFDM symbols) indicated by the preemption indication. Thereafter, when the user equipment needs to transmit specific information, the user equipment can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the user equipment receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the user equipment transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
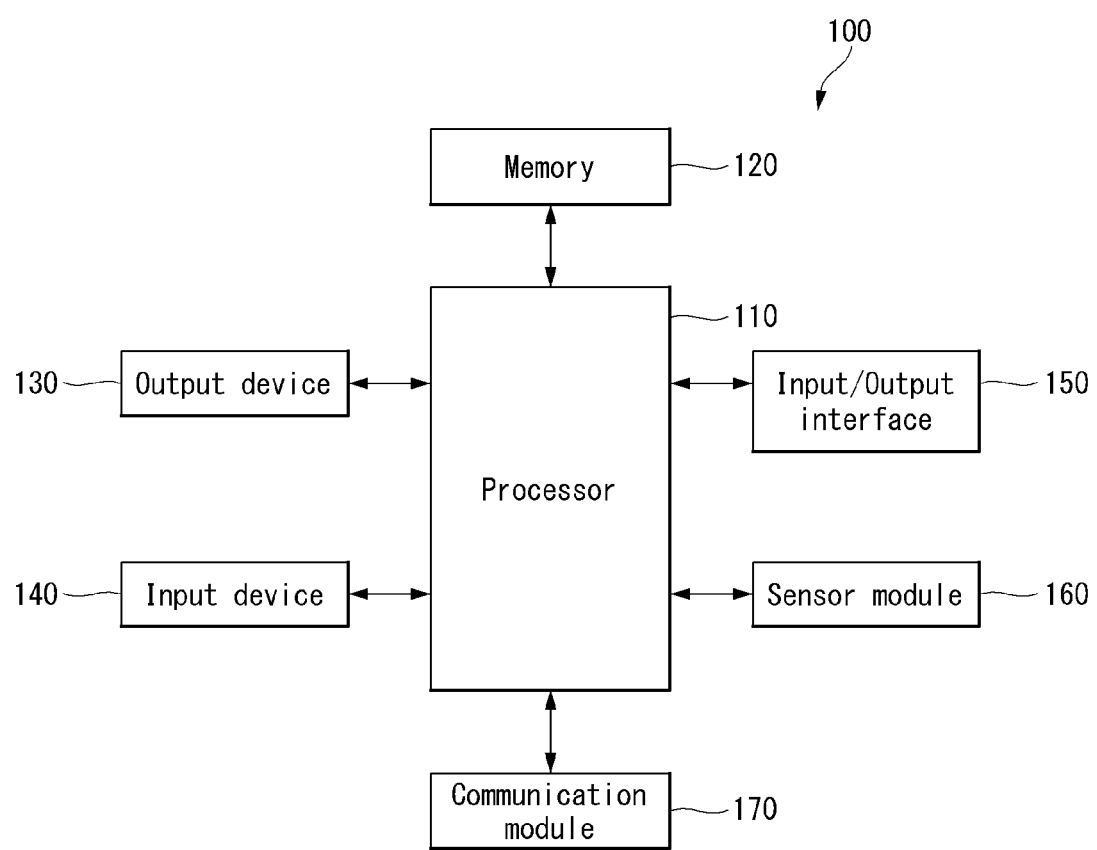
FIG. 4 is a diagram illustrating a block diagram of an electronic device.

FIG. 4 is a diagram illustrating a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include one or more application processors (AP), one or more communication processors (CP), or at least one or more artificial intelligence processors (AI processors). The application processor, the communication processor, or the AI processor may be included in different integrated circuit (IC) packages, respectively, or may be included in one IC package.

The application processor may run an operating system or an application program to control a plurality of hardware or software components connected to the application processor, and perform various data processing/operations including multimedia data. As an example, the application processor may be implemented as a system on chip (SoC). The processor 110 may further include a graphic processing unit (GPU) (not shown).

The communication processor may perform functions of managing data links and converting a communication protocol in communication between the electronic device 100 and other electronic devices connected through a network. As an example, the communication processor may be implemented as an SoC. The communication processor may perform at least some of the multimedia control functions.

In addition, the communication processor may control data transmission and reception of the communication module 170. The communication processor may be implemented to be included as at least a part of the application processor.

The application processor or the communication processor may load and process a command or data received from at least one of a nonvolatile memory or other components connected to each to a volatile memory. Also, the application processor or the communication processor may store data received from at least one of the other components or generated by at least one of the other components in the nonvolatile memory.

The memory 120 may include an internal memory or an external memory. The internal memory may include at least one of the volatile memory (for example, dynamic RAM (DRAM), static RAM (SRAM), synchronous dynamic RAM (SDRAM), etc.) or the nonvolatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may further include a flash drive, for example, compact flash (CF), secure digital (SD), micro secure digital (Micro-SD), mini secure digital (Mini-SD), and extreme digital (xD) or a memory stick, etc.

The output device 130 may include at least one or more of a display module and a speaker. The output device 130 may display various types of data including multimedia data, text data, voice data, and the like to a user or output it as sound.

The input device 140 may include a touch panel, a digital pen sensor, a key, or an ultrasonic input device, etc. For example, the input device 140 may be the input/output interface 150. The touch panel may recognize a touch input using at least one of a capacitive type, a pressure sensitive type, an infrared type, or an ultrasonic type. In addition, the touch panel may further include a controller (not shown). In the case of capacitive type, not only direct touch but also proximity recognition is possible. The touch panel may further include a tactile layer. In this case, the touch panel may provide a tactile reaction to the user.

The digital pen sensor may be implemented using the same or similar method as receiving a user's touch input, or using a separate recognition layer. Keys may be keypads or touch keys. The ultrasonic input device is a device that can check data by detecting a micro sound wave in a terminal through a pen that generates an ultrasonic signal, and is capable of wireless recognition. The electronic device 100 may receive a user input from an external device (e.g. a network, a computer, or a server) connected thereto by using the communication module 170.

The input device 140 may further include a camera module and a microphone. The camera module is a device capable of capturing images and moving pictures, and may include one or more image sensors, an image signal processor (ISP), or a flash LED. The microphone may receive an audio signal and convert it into an electrical signal.

The input/output interface 150 may transmit commands or data input from the user through the input device or the output device to the processor 110, the memory 120, the communication module 170, etc. through a bus (not shown). For example, the input/output interface 150 may provide data on a user's touch input entered through the touch panel to the processor 110. For example, the input/output interface 150 may output commands or data received from the processor 110, the memory 120, the communication module 170, etc. through the bus through the output device 130. For example, the input/output interface 150 may output voice data processed through the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor and an ultra violet (UV) sensor. The sensor module 160 may measure a physical quantity or detect an operating state of the electronic device 100 and convert the measured or detected information into an electric signal. Additionally or alternatively, the sensor module 160 may include an olfactory sensor (E-nose sensor), an EMG sensor (electromyography sensor), an EEG sensor (electroencephalogram sensor, not shown), an ECG sensor (electrocardiogram sensor), a PPG sensor (photoplethysmography sensor), a heart rate monitor sensor (HRM), a perspiration sensor or a fingerprint sensor, etc. The sensor module 160 may further include a control circuit for controlling at least one or more sensors included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or modem for connecting the electronic device 100 to a network (example: internet, LAN, WAN, telecommunication network, cellular network, satellite network, POTS or 5G network, etc.).

The RF module may be responsible for transmission and reception of data, for example, transmission and reception of RF signals or called electronic signals. For example, the RF module may include a transceiver, a power amp module (PAM), a frequency filter or a low noise amplifier (LNA), etc. In addition, the RF module may further include components for transmitting and receiving an electromagnetic wave in a free space in wireless communication, for example, a conductor or a wire.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, a lighting, a washing machine and a smart plug. Since the components of the electronic device 100 described in FIG. 4 are examples of components generally included in the electronic device, the electronic device 100 according to the embodiment of the present disclosure is not limited to the above-described components, and may be omitted and/or added as necessary.

Figure 5:
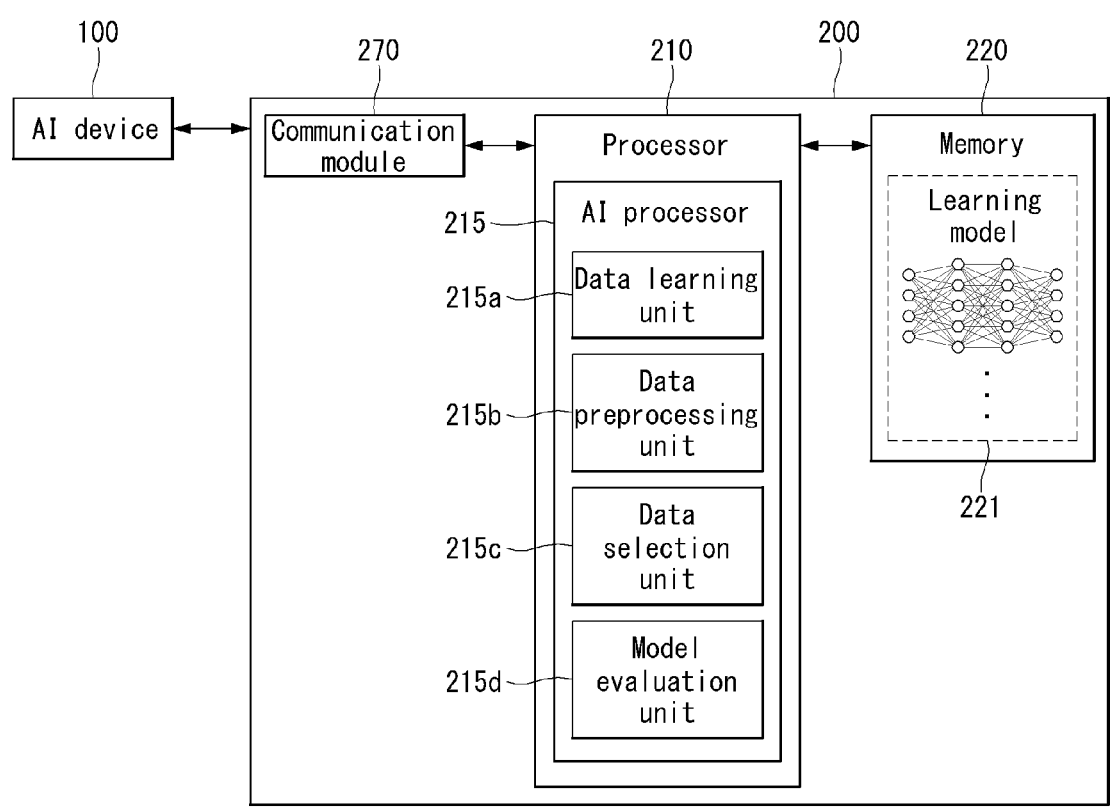
FIG. 5 illustrates a schematic block diagram of an AI server according to an embodiment of the present disclosure.

The electronic device 100 may perform an artificial intelligence-based control operation by receiving the AI processing result from the cloud environment shown in FIG. 5 or may include an AI module in which components related to the AI process are integrated into one module to perform AI processing in an on-device method.

Hereinafter, an AI process performed in a device environment and/or a cloud environment or a server environment will be described through FIGS. 5 and 6. FIG. 5 illustrates an example in which receiving data or signals may be performed in the electronic device 100, but AI processing to process input data or signals may be performed in a cloud environment. In contrast, FIG. 6 illustrates an example of on-device processing in which the overall operation related to AI processing for input data or signals is performed in the electronic device 100.

Figure 6:
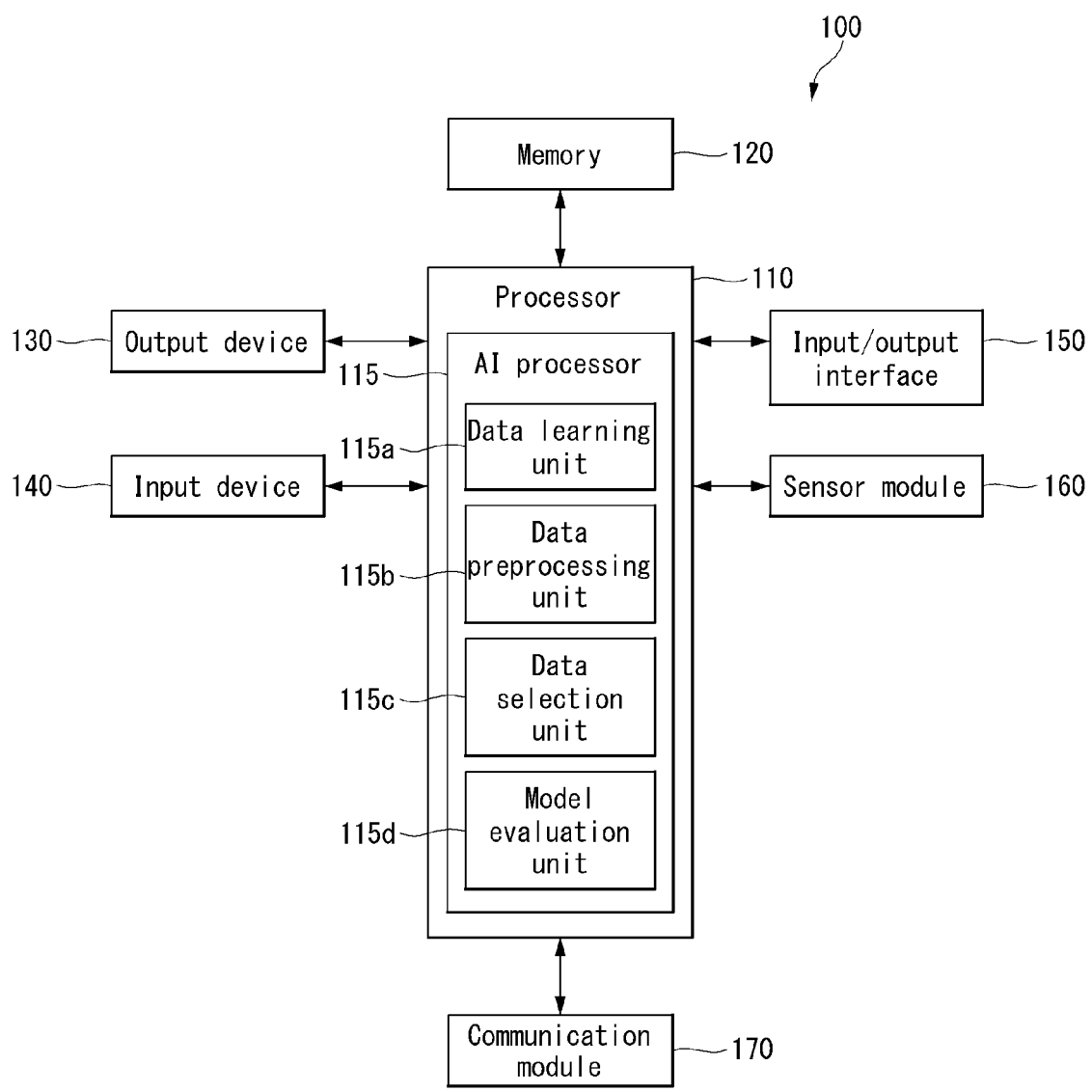
FIG. 6 illustrates a schematic block diagram of an AI device according to another embodiment of the present disclosure.

In FIGS. 5 and 6, the device environment may be referred to as 'client device' or 'AI device', and the cloud environment may be referred to as 'server' or 'AI server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn a neural network for recognizing data related to an operation of an AI device 100. Here, the neural network may be designed to simulate a human brain structure (e.g. a neuron structure of a human neural network) on a computer. The neural network may include an input layer, an output layer, and at least one hidden layer. Each layer may include at least one neuron having a weight, and the neural network may include a synapse connecting neurons and neurons. In the neural network, each neuron may output an input signal input through the synapse as a function value of an activation function for weight and/or bias.

A plurality of network nodes may exchange data according to each connection relationship so that the neurons simulate synaptic activity of neurons that exchange signals through synapses. Here, the neural network may include a deep learning model developed from a neural network model. In the deep learning model, a plurality of network nodes may exchange data according to a convolutional connection relationship while being located in different layers. Examples of neural network models may include various deep learning techniques such as a deep neural network (DNN), a convolutional neural network (CNN), a recurrent neural network, a restricted Boltzmann machine, and a deep belief network, a deep Q-Network, and may be applied in fields such as vision recognition, speech recognition, natural language processing, and voice/signal processing.

Meanwhile, the processor 210 performing the functions as described above may be a general-purpose processor (e.g. a CPU), but may be an AI dedicated processor (e.g. a GPU) for artificial intelligence learning.

The memory 220 may store various programs and data required for the operation of the AI device 100 and/or the server 200. The memory 220 may be accessed by the AI processor 215, and may read/write/edit/delete/update data by the AI processor 215. In addition, the memory 220 may store a neural network model (e.g. a deep learning model) generated through a learning algorithm for data classification/recognition according to an embodiment of the present disclosure. Furthermore, the memory 220 may store not only the learning model 221 but also input data, learning data, and learning history, etc.

Meanwhile, the AI processor 215 may include a data learning unit 215a for learning a neural network for data classification/recognition. The data learning unit 215a may learn a criterion for which learning data to use in order to determine data classification/recognition and how to classify and recognize data using the learning data. The data learning unit 215a may learn the deep learning model by acquiring learning data to be used for learning and applying the acquired learning data to the deep learning model.

The data learning unit 215a may be manufactured in the form of at least one hardware chip and mounted on the server 200. For example, the data learning unit 215a may be manufactured in the form of a dedicated hardware chip for artificial intelligence, and may be manufactured as a part of a general-purpose processor (CPU) or a graphics dedicated processor (GPU) and mounted on the server 200. Further, the data learning unit 215a may be implemented as a software module. When implemented as a software module (or a program module including an instruction), the software module may be stored in a computer-readable non-transitory computer readable media. In this case, at least one software module may be provided to an operating system (OS) or may be provided by an application.

The data learning unit 215a may learn to have a criterion for determining how a neural network model classifies/recognizes predetermined data using the acquired learning data. In this case, the learning method by the model learning unit may be classified into supervised learning, unsupervised learning, and reinforcement learning. Here, the supervised learning may refer to a method of learning an artificial neural network in a state where a label for learning data is given, and the label may mean a correct answer (or result value) that the artificial neural network must infer when the learning data is input to the artificial neural network. The unsupervised learning may mean a method of learning an artificial neural network in a state where a label for learning data is not given. The reinforcement learning may mean a method in which an agent defined in a specific environment learns to select an action or action sequence that maximizes the cumulative reward in each state. In addition, the model learning unit may learn the neural network model using a learning algorithm including an error backpropagation method or a gradient decent method. When the neural network model is learned, the learned neural network model may be referred to as a learning model 221. The learning model 221 may be stored in the memory 220 and used to infer a result of new input data other than the learning data.

On the other hand, in order to improve the analysis results using the learning model 221, or to save resources or time required for the generation of the learning model 221, the AI processor 215 may further include a data preprocessing unit 215b and/or a data selection unit 215c.

The data preprocessing unit 215b may preprocess the acquired data so that the acquired data can be used for learning/inference for determining a situation. For example, the data preprocessing unit 215b may extract feature information as preprocessing for input data acquired through the input device, and the feature information may be extracted in a format such as a feature vector, a feature point, or a feature map.

The data selection unit 215c may select data necessary for learning among learning data or learning data preprocessed in the preprocessing unit. The selected learning data may be provided to the model learning unit. As an example, the data selection unit 215c may select only data on an object included in a specific region as learning data by detecting the specific region among images acquired through a camera of the electronic device. In addition, the data selection unit 215c may select data necessary for inference among input data acquired through the input device or input data preprocessed by the preprocessing unit.

In addition, the AI processor 215 may further include a model evaluation unit 215d to improve the analysis result of the neural network model. When the model evaluation unit 215d inputs evaluation data to the neural network model and the analysis result output from the evaluation data does not satisfy a predetermined criterion, the model evaluation unit 215d may cause the model learning unit to relearn. In this case, the evaluation data may be predetermined data for evaluating the learning model 221. As an example, among the analysis results of the learned neural network model for evaluation data, when the number or ratio of evaluation data with inaccurate analysis results exceeds a predetermined threshold, the model evaluation unit 215d may evaluate that the predetermined criterion is not satisfied.

The communication module 270 may transmit the AI processing result by the AI processor 215 to an external electronic device.

In FIG. 5 above, it has been described that an example in which an AI process is implemented in a cloud environment due to computing operation, storage, and power constraints, but the present disclosure is not limited thereto, and the AI processor 215 may be implemented in a client device. FIG. 6 is an example in which AI processing is implemented in the client device, and is the same as illustrated in FIG. 5 except that the AI processor 215 is included in the client device.

FIG. 6 illustrates a schematic block diagram of an AI device according to another embodiment of the present disclosure.

The function of each configuration shown in FIG. 6 may refer to FIG. 5. However, since the AI processor is included in the client device 100, it may not be necessary to communicate with the server (200 in FIG. 5) in performing processes such as data classification/recognition, and accordingly, immediate or real-time data classification/recognition operation is possible. In addition, since there is no need to transmit the user's personal information to the server (200 in FIG. 5), the data classification/recognition operation for the purpose is possible without external leakage of the personal information.

On the other hand, each of the components shown in FIGS. 5 and 6 represents functional elements that are functionally divided, and it is noted that at least one component may be implemented in a form that is integrated with each other (e.g. an AI module) in an actual physical environment. It goes without saying that components not disclosed in addition to the plurality of components illustrated in FIGS. 5 and 6 may be included or omitted.

Figure 7:
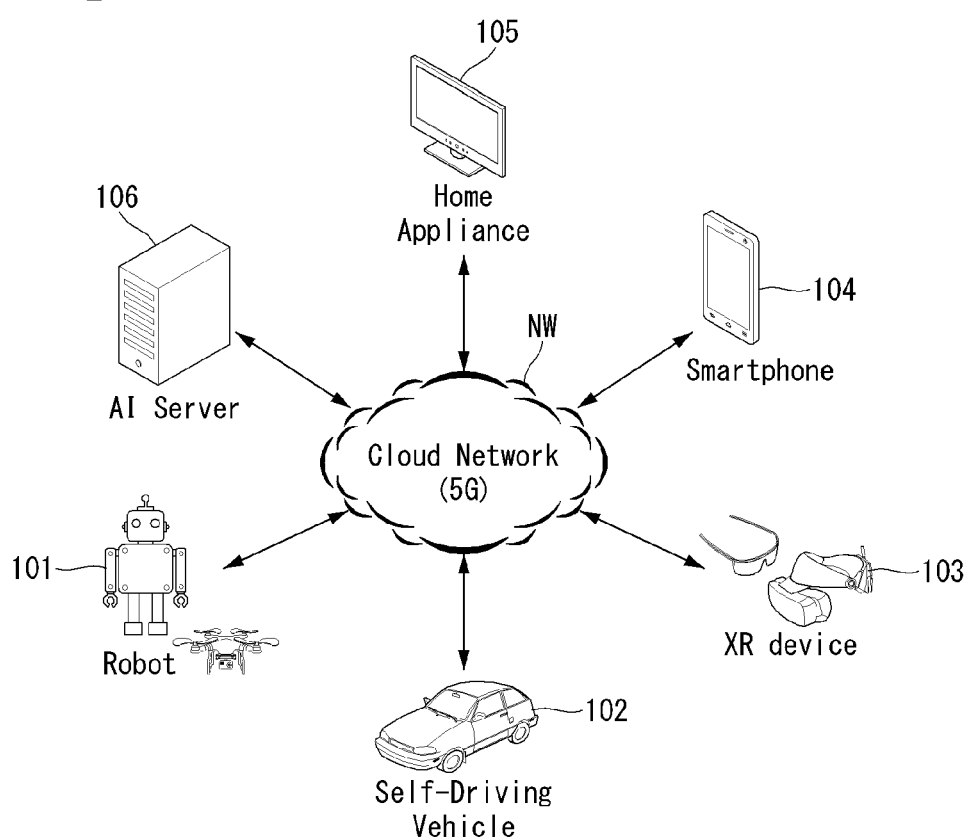
FIG. 7 is a conceptual diagram illustrating an embodiment of an AI device.

FIG. 7 is a conceptual diagram illustrating an embodiment of an AI device.

Referring to FIG. 7, in an AI system 1, at least one of an AI server 106, a robot 101, a self-driving vehicle 1002, an XR device 103, a smartphone 104, or a home appliance 105 are connected to a cloud network NW. Here, the robot 101, the self-driving vehicle 1002, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. Here, the cloud network NW may be configured using the 3G network, the 4G or the Long Term Evolution (LTE) network, or the 5G network.

That is, each of the devices 101 to 106 constituting the AI system 1 may be connected to each other through the cloud network NW. In particular, each of the devices 101 to 106 may communicate with each other through a base station, but may communicate directly with each other without going through the base station.

The AI server 106 may include a server performing AI processing and a server performing operations on big data.

The AI server 106 may be connected to at least one of the robots 101, the self-driving vehicle 1002, the XR device 103, the smartphone 104, or the home appliance 105, which are AI devices constituting the AI system, through the cloud network NW, and may assist at least some of the AI processing of the connected AI devices 101 to 105.

At this time, the AI server 106 may learn the artificial neural network according to the machine learning algorithm on behalf of the AI devices 101 to 105, and directly store the learning model or transmit it to the AI devices 101 to 105.

At this time, the AI server 106 may receive input data from the AI devices 101 to 105, infer a result value for the received input data using the learning model, generate a response or a control command based on the inferred result value and transmit it to the AI devices 101 to 105.

Alternatively, the AI devices 101 to 105 may infer the result value for the input data directly using the learning model, and generate a response or a control command based on the inferred result value.

Figure 8:
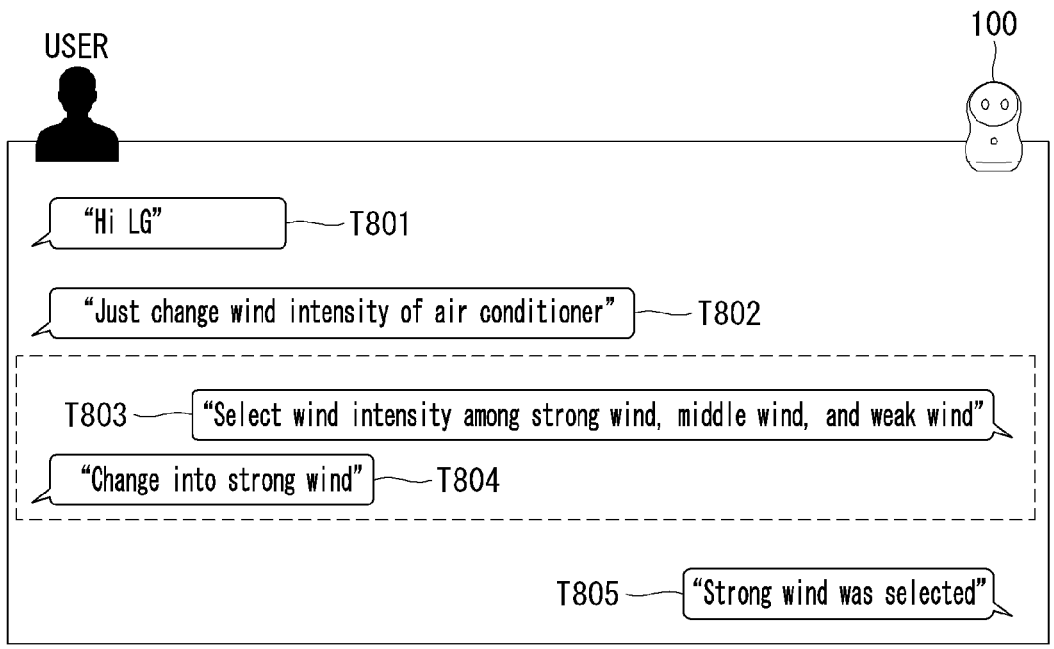
FIG. 8 is a flowchart of a voice reception method according to an embodiment of the present disclosure.

FIG. 8 is a flowchart of a voice reception method according to an embodiment of the present disclosure.

Referring to FIG. 8, when a user utters "Hi LG (T801)", the speech processing device 100 may have its state switch into an activation state in response to the maneuvering word "Hi LG (T801)" of the user. The speech processing device 100 may perform communication with the user in the activation state. More specifically, the speech processing device 100 may determine an utterance intent and an entity name by analyzing the utterance of the user, and may generate a response to the utterance of the user based on the determined utterance intent and entity name. For example, when the user inputs a command "Just change the wind intensity of the air conditioner (T802)", the speech processing device 100 may output an informing utterance "Select wind intensity among a strong wind, a middle wind, and a weak wind (T803)" through the speaker in response to the command. After the user fully listens to the informing utterance, the user may input another command (e.g., "Change into a strong wind (T804)"). Thereafter, the speech processing device 100 may perform a control operation (e.g., a response output such as "Strong wind was selected (T805)"), corresponding to the command, in response to the command from the user.

After fully outputting the informing utterance through the speaker, the speech processing device 100 may turn on a voice reception function and receive a response to the provided informing utterance of the user. As described above, a dialogue using a method of fully providing an utterance on one side and then responding as an utterance on the other side in a dialogue between a user and the voice recognition system has an unnatural problem, unlike in an utterance actually performed between persons. Hereinafter, in the present disclosure, a voice recognition system through which a natural conversation is possible even in a relation between a person and a machine as in a relation between persons.

On-Device Natural Language Processing (NLP)

Figure 9:
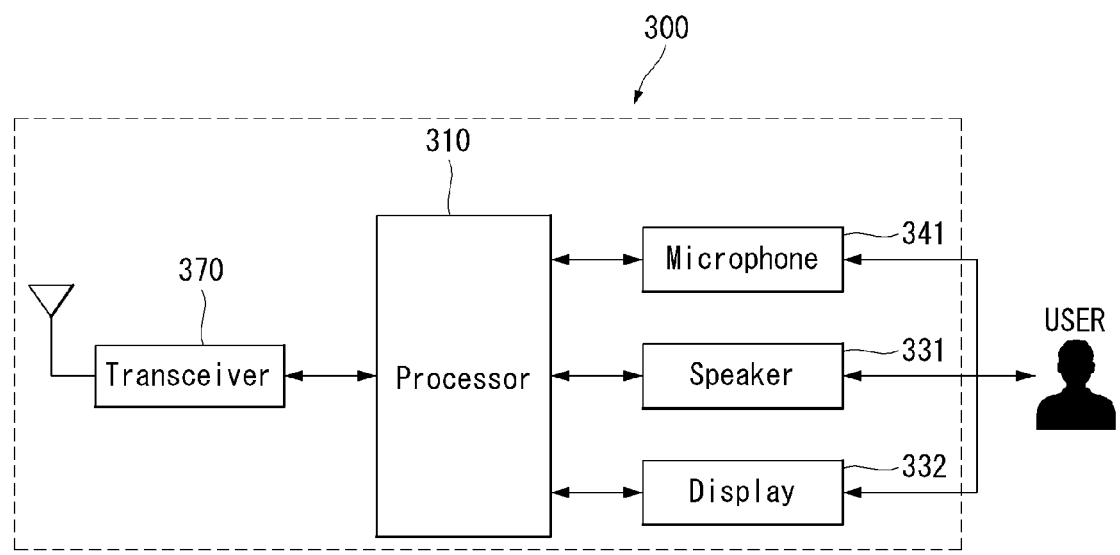
FIG. 9 is a block diagram of an NLP system according to an embodiment of the present disclosure.

FIG. 9 is a block diagram of an NLP system according to an embodiment of the present disclosure. Elements illustrated in FIG. 9 are functionally separated elements, and one or more elements may be implemented in a form in which they are integrated in an actual physical environment. Furthermore, the speech processing device 300 of FIG. 9 may be implemented as an example of the AI device illustrated in FIG. 6, and a description of a redundant function element is omitted.

Referring to FIG. 9, the speech processing device 300 may include a microphone 341, a speaker 331, a display 332, a transceiver 370, and a processor 310.

The speaker 331 may play back audio data. The microphone 341 may receive a voice or other audio signal from a user. The voice signal received through the microphone 341 may be transmitted to the processor 310 of the speech processing device 300, and thus becomes a target of natural language processing (NLP). Furthermore, the processor 310 may transmit information to the AI system (1 in FIG. 7) capable of communicating with the speech processing device 300 by controlling the transceiver 370, and may receive AI-processed (e.g., NLP) information from the AI system (1 in FIG. 7).

A memory may store various types of software related to NLP. The software related to NLP may include an automatic speech recognition (ASR) module, a natural language understanding (NLU) module, and a natural language generation (NLG) module, but is not limited thereto. Furthermore, the memory may store a neural network model for determining activation timing of the microphone 341 applied to an embodiment of the present disclosure. The neural network model may be a deep learning model having multiple nodes and layers, but is not limited thereto. Furthermore, the memory may store multiple informing utterances to be provided from the speech processing device 300 to a user through the speaker 331 or the display 332. An informing utterance may include a previously stored first informing utterance and a second informing utterance generated by a generative model. The generative model is a neural network model pre-trained based on embedding associated with the first informing utterance and may generate a rule-based informing utterance, but the present disclosure is not limited thereto.

The speech processing device 300 may provide an informing utterance to a user. The informing utterance may include messages associated with various services (e.g., a display on the display 332 and a sound output) of the electronic device, but is not limited thereto. For example, a service related to an operation of an air conditioner may include "Adjustment of wind intensity", and an informing utterance may be implemented like "Select wind intensity among a strong wind, a middle wind, and a weak wind." In the present disclosure, a "first utterance" may be defined as an "informing utterance." The speech processing device 300 may output the first utterance through the speaker 331 or display the first utterance on the display 332. Furthermore, the speech processing device 300 may transmit the first utterance to an external terminal through the transceiver 370.

The processor 310 may activate the microphone 341 from one timing in the entire period in which the first utterance is provided. Specifically, the speech processing device 300 may generate information on activation timing of the microphone 341 at which a response to the first utterance is received. The information on the activation timing of the microphone 341 denotes information on one timing in the entire period in which the first utterance is provided. For example, if a total playback time of the first utterance is 10 s, the microphone 341 may be deactivated for 0 s~6 s and may be activated for 6 s~10 s. In this case, the information on the activation timing may be generated as information having a form, such as "6 s", "60%", or "0.6."

The processor 310 may tag information on activation timing of the first utterance onto the first utterance. The processor 310 may determine whether to activate the microphone 341 based on the first utterance onto which the information on the activation timing has been tagged or tagged information among feature vectors (e.g., embedding) for the first utterance. The processor 310 may perform the tagging of the information on the activation timing onto multiple first utterances which may be stored in the memory or received from the AI system (1 in FIG. 7). Before providing the first utterance, the processor 310 may analyze the information on the activation timing tagged onto the first utterance, and may control the microphone 341 to be activated at the moment when pre-determined activation timing is reached.

In an embodiment of the present disclosure, the information on the activation timing may be generated using a pre-trained neural network model. The processor 310 may load the neural network model for determining the activation timing, which is stored in the memory, and may generate information on the activation timing using the neural network model. In this case, the neural network model is a model previously trained by setting, as learning data, (i) the first utterance or an embedding vector for the first utterance and (ii) log data related to timing at which a response to the first utterance is received in a total output time of the first utterance.

The processor 310 may extract an embedding vector related to the first utterance. The embedding vector is defined as a feature vector related to the first utterance. The embedding vector may be extracted using Word2vec or ELMo, but the present disclosure is not limited thereto. The processor 310 may apply the embedding vector related to the first utterance to the pre-trained neural network model. As described above, if an embedding vector related to the first utterance is set as input data and applied to the neural network model, the processor 310 may generate an output for determining activation timing of the microphone 341. The processor 310 may determine information on the activation timing based on the output, and may generate the information on the activation timing. The neural network model has been trained based on a response pattern (e.g., response timing in the output of the first utterance) for the first utterance of the user. Accordingly, the processor 310 may determine activation timing of the microphone 341 optimized for each user.

When the information on the activation timing the microphone 341 is generated, the processor 310 may match or tag the generated information onto the first utterance. Assuming that 6 seconds are taken up to "Wind intensity among a strong wind, a middle wind, and a weak wind" with respect to an informing utterance "Select wind intensity among a strong wind, a middle wind, and a weak wind" onto which "0.6" has been tagged, the processor 310 may change the state of the microphone 341 to the activation state after an informing utterance up to "Wind intensity among a strong wind, a middle wind, and a weak wind" is output. In this case, "0.6" tagged onto the informing utterance is an example of a tag form of the information on the activation time, and the present disclosure is not limited thereto.

As described above, the speech processing device 300 according to an embodiment of the present disclosure can reduce the time taken for a dialogue to be turned, which is performed between a user and the speech processing device 300, by considering start timing of a different response for each user.

Furthermore, the speech processing device 300 can increase the usability and utilization of a dialogue system by reducing the time taken for a dialogue to be turned, which is performed between a user and the speech processing device 300.

Furthermore, the speech processing device 300 can improve performance of voice processing by removing an unnecessary speech signal or noise received in a deactivation state by controlling the activation state of the microphone 341.

Furthermore, the speech processing device 300 can improve the degradation of a recognition ratio of a user voice attributable to a sound output through the speaker 331 by controlling the activation state of the microphone 341.

The speech processing device 300 according to various embodiments of the present disclosure may further perform intent analysis of a partial utterance in order to form smooth communication between a person and a machine, in addition to an operation associated with activation timing of the microphone 341.

The speech processing device 300 may receive a second utterance through the activated microphone 341. The second utterance is defined as a response to the first utterance.

The processor 310 may extract at least one of intent or the entity of the second utterance and generated a response to the second utterance. According to the present disclosure, a response to the second utterance may be generated according to various embodiments.

For example, the processor 310 may split the second utterance into N (N is a natural number) sub-sections. The processor 310 may specify a first extraction section including first to M-th sub-sections (M is a natural number, M<N) of the N sub-sections, and may extract at least one of intent or an entity from the specified first extraction section. In this case, N may be determined the number of tokens that configure text, that is, a target of an utterance intent to be determined. The token is defined as text split for natural language understanding (NLU). In some embodiments of the present disclosure, the processor 310 may tokenize the text in a word unit.

In this case, the processor 310 may compare reliability of the extracted intent or entity with preset reliability. When the reliability of the intent is less than a preset reference value, the processor 310 may extract at least one of intent or an entity from a second extraction section including the first to P-th sub-sections (P is a natural number, M<P≤N) of the N sub-sections. The processor 310 compares reliability of intent, extracted from the second extraction section, with the preset reference value, and terminates natural language understanding (NLU) when the reliability of the extracted intent is the reference value or more. If intent or an entity is extracted from two or more extraction sections, the processor 310 generates a response to the second utterance based on based on pieces of extracted information having higher reliability of the intent, and excludes extracted information having lower reliability from the generation of the response. In this case, the natural number M and the natural number P may be values preset by the user.

The extraction of information on NLU from the second extraction section may be performed simultaneously with the processing process in the first extraction section. In this case, the first extraction section includes relatively less sub-sections than the second extraction section, and thus the processing of the first extraction section may be first completed. The processor 310 may evaluate the results of NLU for the first extraction section, and may stop or terminate NLU being performed on the second extraction section when reliability of the intent extracted from the first extraction section is the preset reference value or more. As described above, the speech processing method according to some embodiments of the present disclosure can derive faster and more accurate NLU results by comparing reliabilities of NLU processes in different extraction sections sequentially or in parallel.

Furthermore, when the reliability of the intent is less than the preset reference value, the processor 310 may extract at least one of intent or an entity from a third extraction section including the first to K-th sub-sections (K is a natural number, M<K≤N) of the N sub-sections. In this case, the processor 310 may extract information on NLU by gradually adjusting the range of the third extraction section. Accordingly, the processor 310 may increase a value of the natural number K by 1 until reliability of intent extracted from the third extraction section reaches the preset reference value. Specifically, the processor 310 specifies an extraction section including the first to L-th sub-section (L is a natural number), and computes first reliability in the extraction section. When the first reliability is less than the reference value, the processor 310 may specify an extraction section including the first to (L+1)-th sub-sections and compute second reliability in the extraction section. The processor 310 may gradually increase the number of sub-sections until reliability reaches the preset reference value.

The extraction of information on NLU in the third extraction section may be performed simultaneously with the processing process in the first extraction section. In this case, the first extraction section includes relatively less sub-sections than the third extraction section, and thus the processing of the first extraction section may be first completed. The processor 310 evaluates the results of NLU for the first extraction section. If reliability of intent extracted from the first extraction section is the preset reference value or more, the processor 310 may stop or terminate the NLU being performed on the third extraction section.

In this case, the third extraction section defines an extraction section including the first to K-th sub-sections, and may be defined as a term including multiple extraction sections in accordance with the diversity of the natural number K. For example, the third extraction section may include all of sections from a (3−L)-th extraction section, including the first to L-th sub-sections, to a (3−N)-th extraction section including the first to N-th sub-sections. If NLU is performed on multiple extraction sections in parallel, the processor 310 may perform NLU on the (3−L)-th extraction section to the (3−N)-th extraction section in parallel. That is, the processor 310 may simultaneously start pieces of (N−L+1) NLU. As a result, if reliability of any one intent in the pieces of multiple NLU is the preset reference value or more, the processor 310 may terminate the remaining NLU processes except the NLU having the reliability of the reference value or more.

As described above, the speech processing method according to some embodiments of the present disclosure can derive faster and more accurate NLU results by comparing reliabilities of NLU processes in different extraction sections sequentially or in parallel.

The speech processing device 300 may generate a response to the second utterance based on the extracted intent or entity. Furthermore, the speech processing device 300 may provide the response to the second utterance through the speaker 331 or the display 332. In this case, if a device for outputting the response to the second utterance is an external terminal (e.g., AI speaker), the speech processing device 300 may control the transceiver 370 to transmit output sound information or image information over a network.

Cloud Environment Natural Language Processing (NLP)

Figure 10:
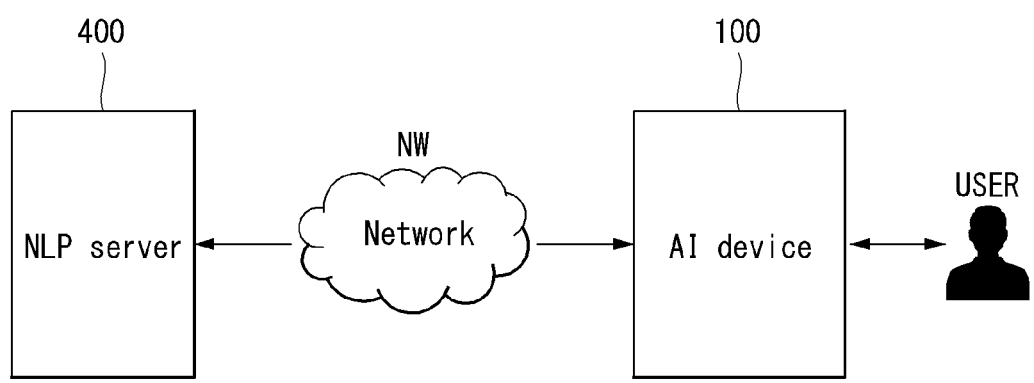
FIG. 10 is a block diagram of an NLP system according to an embodiment of the present disclosure.

FIG. 10 is a block diagram of an NLP system according to an embodiment of the present disclosure. An AI device 100 and NLP server 400 of FIG. 10 may correspond to the AI device and AI server of FIG. 5, respectively. Furthermore, each of the AI device and NLP server of FIG. 10 may include at least some elements forming the speech processing device of FIG. 9. A description of a redundant element in the following description is omitted.

Referring to FIG. 10, the NLP system may include the NLP server 400 and the AI device 100. The AI device 100 may perform the NLP process in association with the NLP server 400. The AI device 100 may transmit information for NLP to the NLP server 400 and receive AI-processed information. The information for NLP may include a text command or an audio command received through a user interface, but is not limited thereto.

The AI device 100 of the NLP system may receive an indication or command from a user through the microphone or the display. The AI device 100 may output the received AI processing information through the display or the speaker.

The NLP server 400 of the NLP system may perform the NLP or NLU process described with reference to FIG. 8. As described above, in the NLP system, the NLP server side may perform NLP that requires many resources, and the AI device side may perform an input/output process for the user. Accordingly, limited resources can be effectively distributed and used. The NLP system according to some embodiments of the present disclosure may perform communication based on the NR described with reference to FIGS. 1 to 3.

Figure 11:
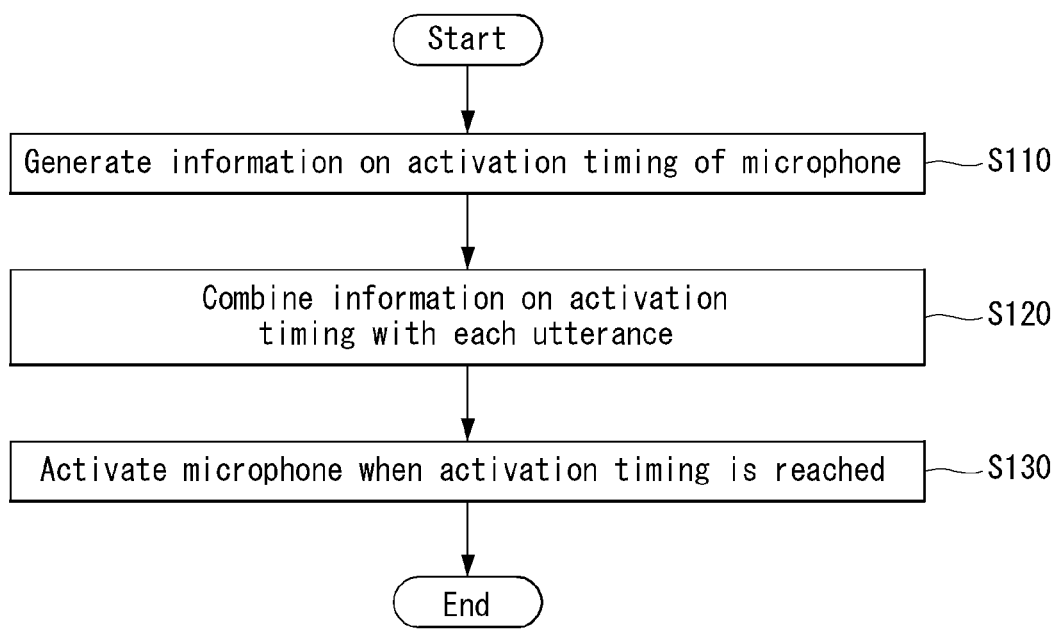
FIG. 11 is a flowchart of control of voice reception according to an embodiment of the present disclosure.

FIG. 11 is a flowchart of control of voice reception according to an embodiment of the present disclosure.

Referring to FIG. 11, the processor 110 of the speech processing device 100 may generate information on activation timing of the microphone (S110). For example, the processor 110 may extract an embedding vector for an utterance. The processor 110 may apply the embedding vector to a pre-trained neural network model, may determine activation timing of the microphone corresponding to an utterance based on an output of the neural network model, and may generate information on the activation timing. In this case, learning data of the neural network model pretrained to determine the activation timing is as follows.

An informing utterance or the embedding vector of the informing utterance

Log data for pieces of timing at which a response to the informing utterance is received That is, at least one parameter of the neural network model may be set to determine an optimal response start time of a user for each of multiple informing utterances stored in the memory.

The processor 110 may combine the information on the activation timing with each utterance (S120). In this case, the information on the activation timing may be combined in a form to be tagged or labeled onto each of a plurality of informing utterances stored in the memory, but the present disclosure is not limited to a specific form.

The processor 110 may measure the time when an utterance from a user is provided, and may generate a signal for activating the microphone in response to the generation of an event when the event reaching activation timing is detected while an utterance is provided (S130). The microphone receives the user's voice only in an activated state, but does not receive an external sound signal or speech signal in a deactivation state. That is, the speech processing device 100 according to an embodiment of the present disclosure may control the microphone to receive a voice by activating the microphone only at an optimized time for each informing utterance. Furthermore, according to an embodiment, performance of NLP can be improved because noise received at timing at which a user is expected to not input a response to an informing utterance is not received.

Figure 12:
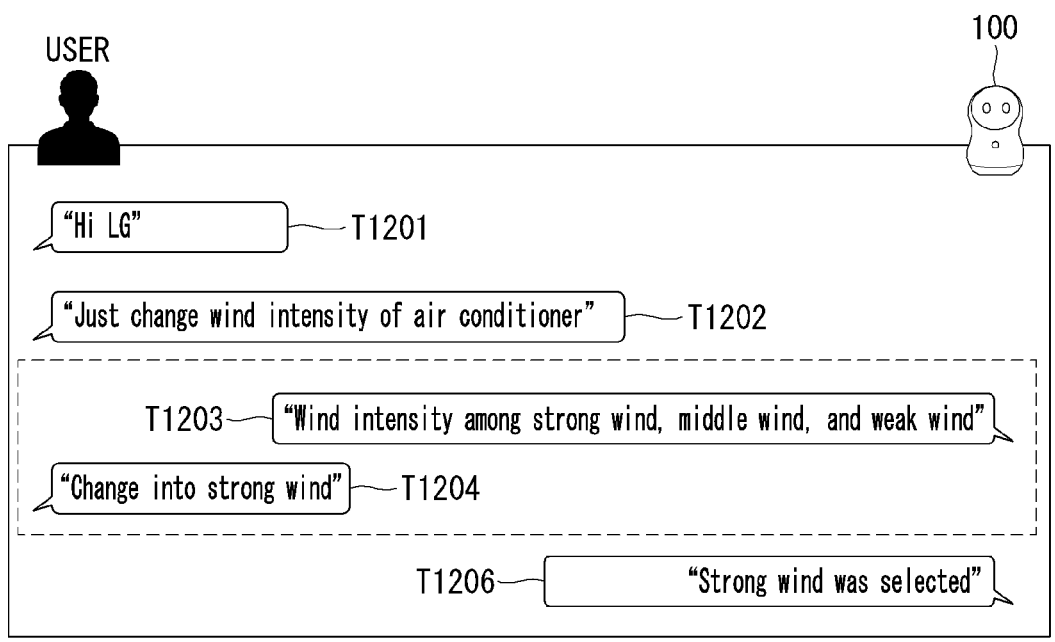
FIG. 12 is a diagram for describing control of voice reception in FIG. 11.

FIG. 12 is a diagram for describing control of voice reception in FIG. 11.

Referring to FIG. 12, the speech processing device 100 may receive a maneuvering word and/or a command from a user. The maneuvering word is text information for activating the NLP function, and the command is text information set to correspond to each control operation. For example, if the maneuvering word is "Hi LG (T1201)", the speech processing device 100 may activate the NLP function in response to the reception of "Hi LG (T1201)." Furthermore, when a command such as "Just change the wind intensity of the air conditioner (T1202)" is received, the speech processing device 100 may output, through the speaker, an informing utterance related to the adjustment of wind intensity of the air conditioner in response to the command.

In outputting an informing utterance, such as "Select wind intensity among a strong wind, a middle wind, and a weak wind", the speech processing device 100 according to an embodiment of the present disclosure may receive a response from a user at one timing before outputting all informing utterances. For example, the speech processing device 100 may activate the microphone after an informing utterance is output up to "Wind intensity among a strong wind, a middle wind, and a weak wind (T1203)", and may receive a response "Change into a strong wind (T1204)" from the user through the activated microphone. That is, the speech processing device 100 does not receive a response from the user prior to the one timing because the microphone is in the deactivation state, and may generate a control signal corresponding to a given function based on only a response from the user, which is received after the one timing.

Furthermore, the speech processing device 100 according to an embodiment may output a message (e.g., "Strong wind was selected (T1205)") for informing the execution of a control operation before performing the control operation corresponding to a given function. In this case, if the message T1204 is received while the message T1203 is output, the speech processing device 100 may stop the output of the message T1203 and control the speaker to output the message T1205.

Figure 13:
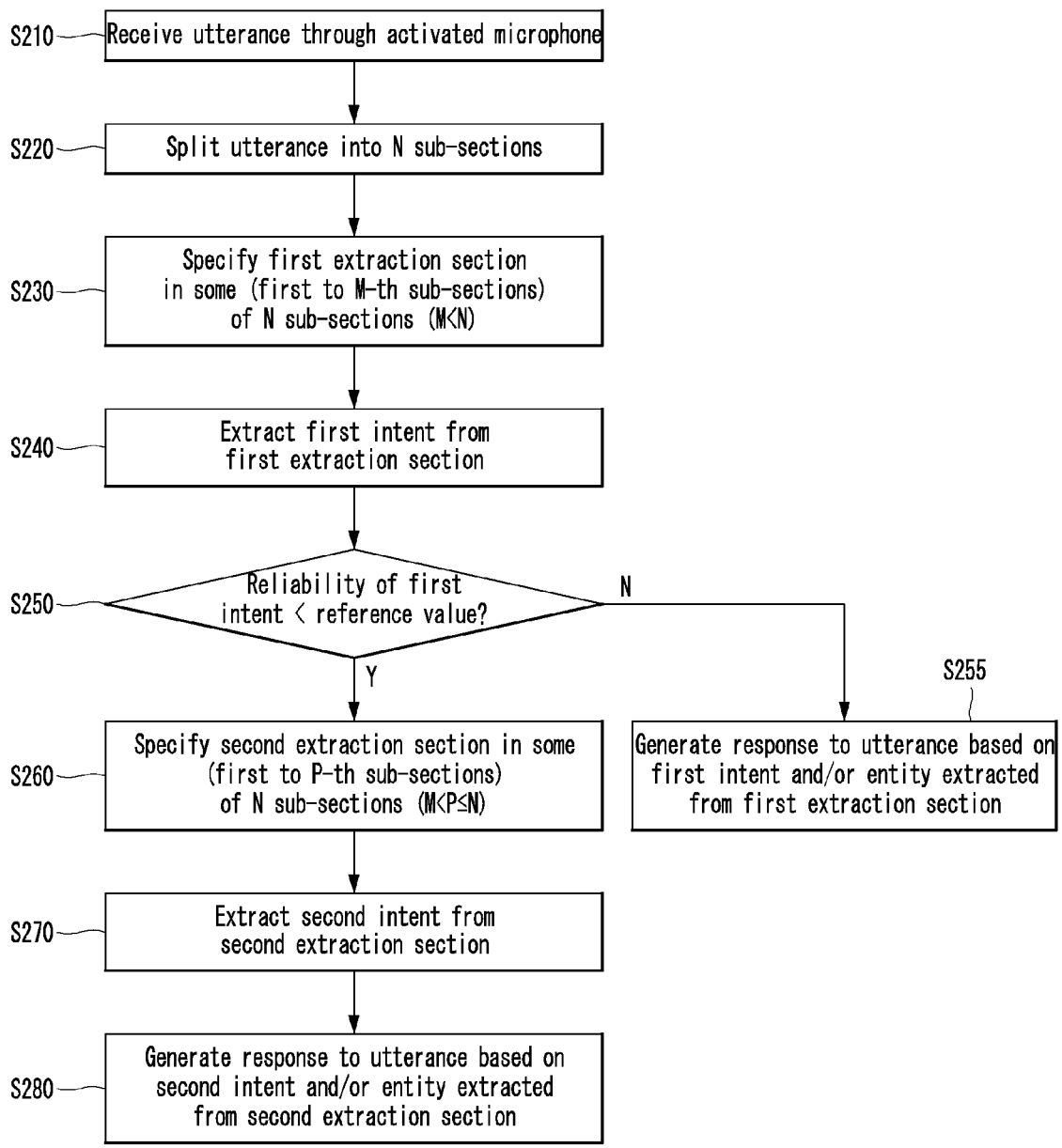
FIGS. 13 to 15 are flowcharts of natural language processing according to an embodiment of the present disclosure.
Figure 14:
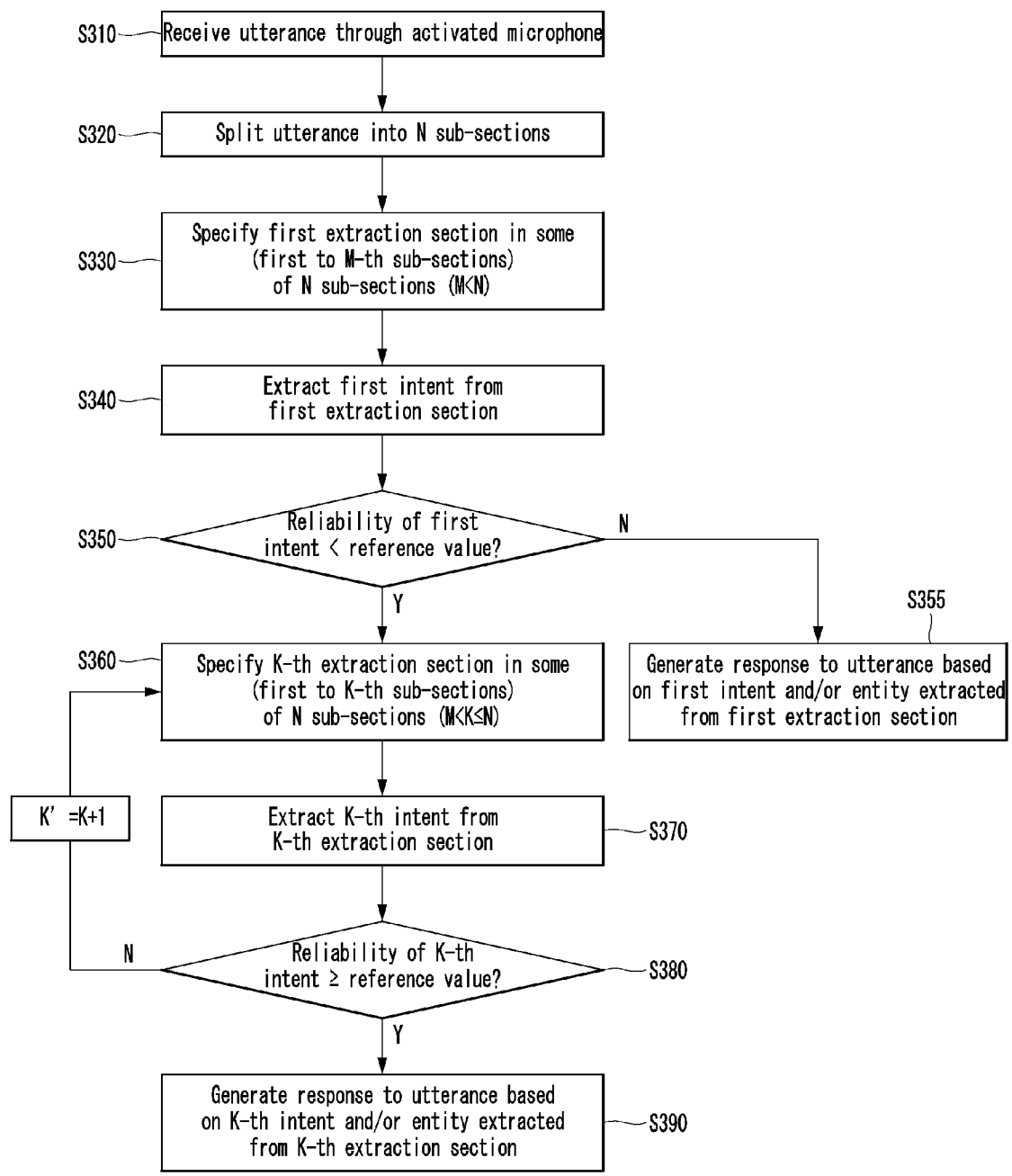
Figure 15:
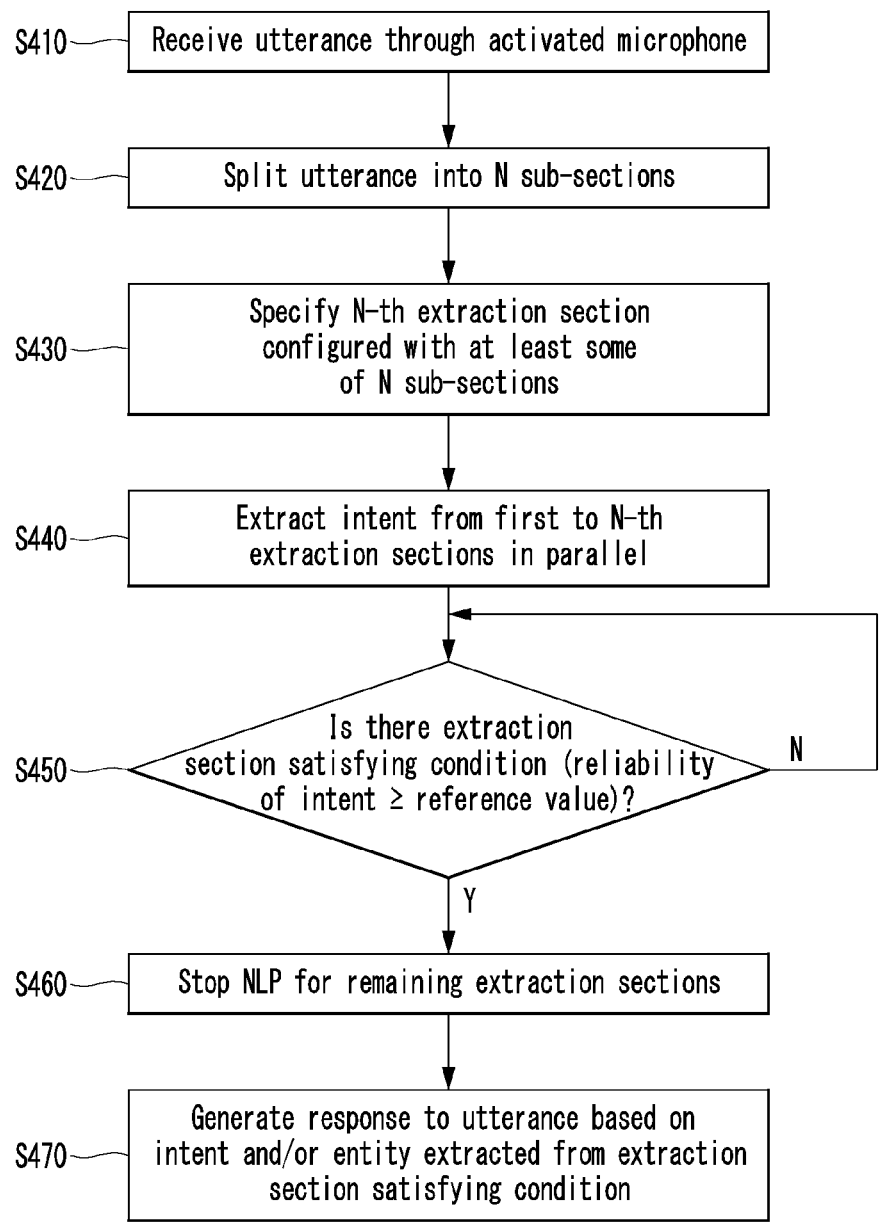

FIGS. 13 to 15 are flowcharts of natural language processing (NLP) according to an embodiment of the present disclosure. At least one of steps illustrated in each of FIGS. 13 to 15 may be omitted or the sequence of the steps may be changed. Contents redundant with the description of the speech processing device 100 or the NLP system are omitted.

Referring to FIG. 13, the speech processing device 100 may receive an utterance from a user through the activated microphone (S210).

The processor 110 may split the utterance into N sub-sections (S220).

The processor 110 may specify a first extraction section in some of the N sub-sections (S230).

The processor 110 may extract a first intent from the first extraction section (S240).

The processor 110 may compare reliability of the first intent with a preset reference value (S250). When the reliability of the first intent is the preset reference value or more (NO in S250), the processor 110 may generate a response to the utterance based on the first intent and/or entity extracted from the first extraction section (S255).

When the reliability of the first intent is less than the preset reference value (YES in S250), the processor 110 may specify a new extraction section (S260). Specifically, the processor 110 may specify a second extraction section in some of the N sub-sections. In this case, the second extraction section may be configured to include more sub-sections than the first extraction section.

The processor 110 may extract a second intent from the second extraction section (S270).

The processor 110 may generate a response to the utterance based on the second intent and/or entity extracted from the second extraction section (S280).

Referring to FIG. 14, the speech processing device 100 may receive an utterance from a user through the activated microphone (S310).

The processor 110 may split the utterance into N sub-sections (S320). The utterance may be split into the sub-sections based on a pause period and/or context between words.

The processor 110 may specify a first extraction section in some of the N sub-sections (S330).

The processor 110 may extract a first intent from the first extraction section (S340).

The processor 110 may compare reliability of the first intent with a preset reference value (S350). When the reliability of the first intent is the preset reference value or more (NO in S350), the processor 110 may generate a response to the utterance based on the first intent and/or entity extracted from the first extraction section (S355).

When the reliability of the first intent is less than the preset reference value, the processor 110 may specify a new extraction section (S360). The processor 110 may specify a K-th extraction section (K is a natural number) in some of the N sub-sections. In this case, the K-th extraction section may be configured to include more sub-sections than the first extraction section.

The processor 110 may extract a K-th intent from the K-th extraction section (S370).

The processor 110 may compare the K-th intent, extracted from the K-th extraction section, with the preset reference value (S380). When reliability of the K-th intent is the preset reference value or more (YES in S380), the processor 110 may generate a response to the utterance based on the K-th intent and/or entity extracted from the K-th extraction section (S390).

In contrast, when the reliability of the K-th intent is less than the preset reference value (NO in S380), the processor 110 may adjust the number or range of sub-sections included in the K-th extraction section (S385). The processor 110 may increase the number of sub-sections by 1 by changing the sub-sections configuring the K-th extraction section from "the first to K-th sub-sections" to "the first to (K+1)-th sub-sections." As described above, the extraction sections configured with "the first to (K+1)-th sub-sections" may be defined as the (K+1)-th extraction section. That is, when reliability of an extracted intent is less than a preset reference value, the processor 110 may gradually increase the range of an extraction section until reliability of intent extracted from a given extraction section is the preset reference value or more.

The speech processing method of FIG. 14 according to an embodiment is a method of extracting intent from a second extraction section configured with more sub-sections if intent extracted from a first extraction section configured with some of the N sub-sections is inappropriate. Such an embodiment has an advantage in that the speech processing device 100 does not need to extract intent for the entire sentence if it has secured targeted reliability based on some of multiple sub-sections.

Furthermore, the speech processing method of FIG. 15 according to an embodiment is a method of extracting intent from the third extraction section configured with more sub-sections when intent extracted from the first extraction section configured with some of the N sub-sections is inappropriate. In the embodiment of FIG. 15, unlike in the embodiment of FIG. 14, the range of an extraction section may be gradually increased by increasing the number of sub-sections configuring an extraction section by 1. As described above, the speech processing method according to an embodiment can infer intent although it does not infer the intent from the entire sentence or paragraph by extracting the intent from a gradually increasing extraction section.

The speech processing method according to an embodiment of the present disclosure may perform NLP on multiple extraction sections configured with at least some of the N sub-sections in parallel (or simultaneously). This is described with reference to FIG. 15.

Referring to FIG. 15, the speech processing device 100 may receive an utterance through the activated microphone (S410).

The processor 110 may split the received utterance into N sub-sections (S420).

The processor 110 may specify first to N-th extraction sections configured with at least some of the N sub-sections (S430). For example, in the case of an utterance "Just show me details of spending this month in LG Pay", the processor 110 may split the utterance into 6 sub-sections. More specifically, the processor 110 may split the utterance into 6 sub-sections, such as "in LG Pay (first sub-section)", "this month (second sub-section)", "spending (third sub-section)", "details (fourth sub-section)", "just (fifth sub-section)", and "show me (sixth sub-section)." In this case, an X-th extraction section (X is a natural number) may be configured with first to X-th sub-sections. That is, an illustrative utterance may be specified as first to sixth extraction sections. The example is merely an implementation example according to some embodiments of the present disclosure. A method of specifying a sub-section or an extraction section is not limited thereto.

The processor 110 may extract pieces of intent from the first to N-th extraction sections in parallel (S440). The processor 110 may perform NLP on multiple extraction sections in parallel (or simultaneously). As a result of the NLP, intent and/or an entity may be extracted from the multiple extraction sections.

If a preset condition is satisfied (e.g., reliability of the intent is a reference value or more) as a result of the execution of the NLP on the first to N-th extraction sections (YES in S450), the processor 110 may control to stop the NLP on the remaining extraction sections except an extraction section for which the analysis of intent is terminated (S460). If the preset condition is not satisfied as a result of the execution of the NLP (NO in S450), the processor 110 maintains the parallel execution of the NLP on multiple extraction sections until the preset condition is satisfied. For example, assuming that the preset condition is satisfied in a Z-th extraction section (1<Z<N, Z is a natural number) while the NLP is performed on the first to N-th extraction sections, the processor 110 may determine that it can generate a response to the utterance based on the Z-th extraction section.

Furthermore, NLP for (Z+1)-th to N-th extraction sections requires a relatively longer processing time because the (Z+1)-th to N-th extraction sections include more sub-sections than the Z-th extraction section. In this case, the processor 110 may stop the NLP for the (Z+1)-th to N-th extraction sections. Accordingly, according to an embodiment, unnecessary waste of resources is reduced, but the intent analysis process can be performed based on some sentence without a need to analyze the entire sentence of an utterance.

When an extraction section to satisfy the preset condition is checked, the processor 110 may generate a response to the utterance based on intent and/or an entity extracted from the checked extraction section (S470).

As described above, the speech processing method of FIG. 15 according to an embodiment performs multiple pieces of NLP in parallel. The parallel NLP may be implemented in such a manner that NLP is performed on each extraction section in accordance with the number of targeted extraction sections. The speech processing method of FIG. 15 according to an embodiment can perform the analysis of intent for an utterance more rapidly by stopping the remaining uncompleted NLP when intent extracted from any one of multiple pieces of NLP satisfies a set condition.

Hereinafter, an implementation example for helping understanding of the various embodiments described with reference to FIGS. 16 to 20 is described. Various embodiments of the present disclosure should not be limited to the examples of FIGS. 16 to 20.

Figure 16:
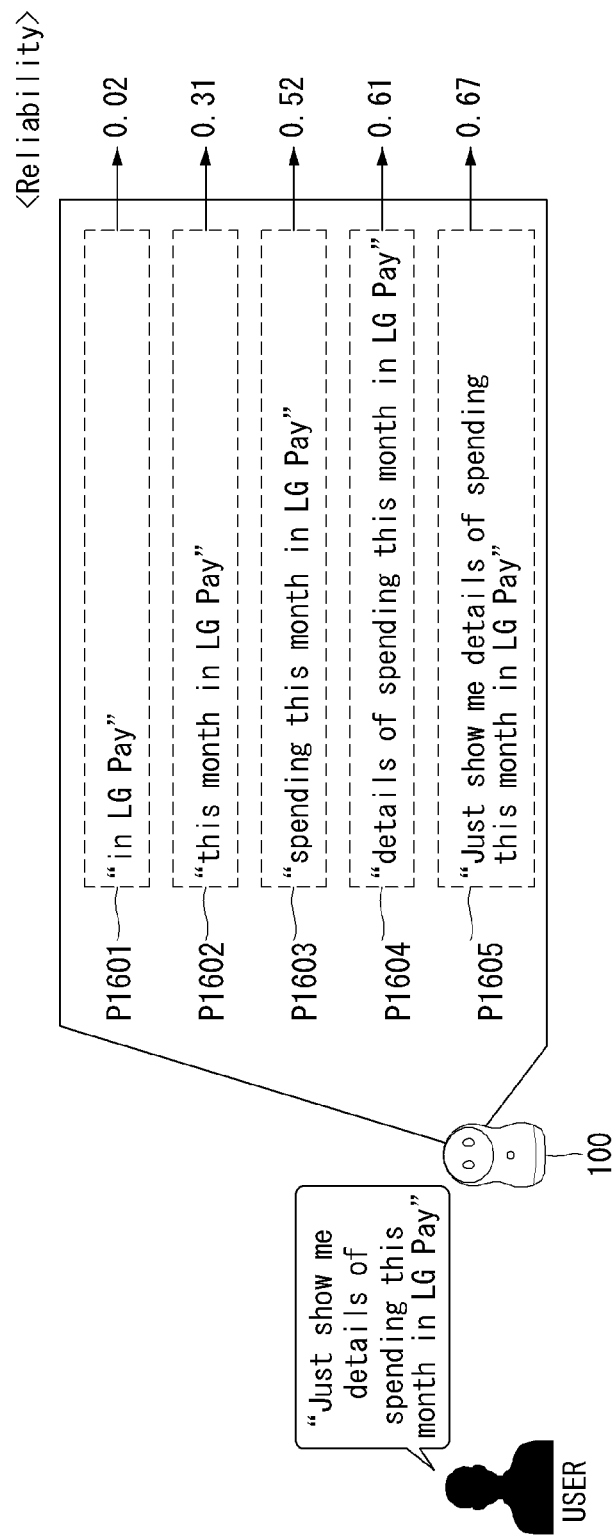
FIGS. 16 to 18 are diagrams for describing NLP in FIGS. 13 to 15.
Figure 17:
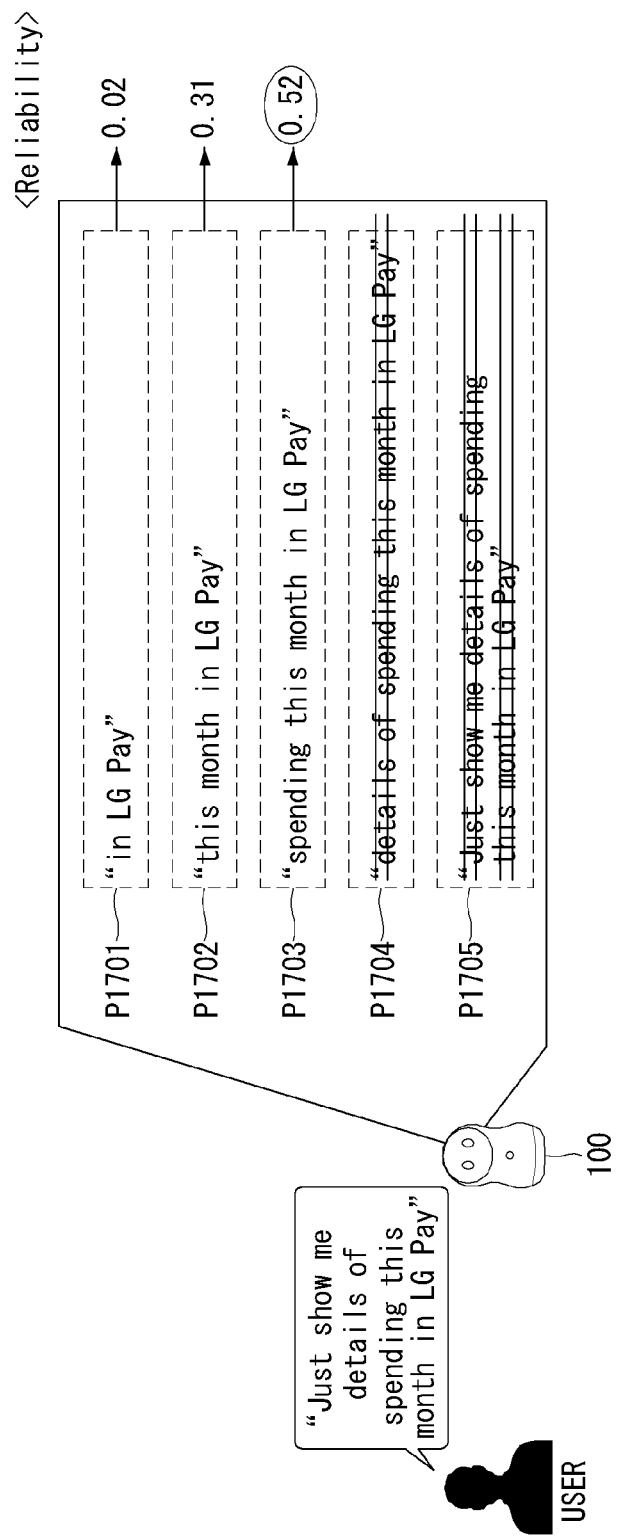
Figure 18:
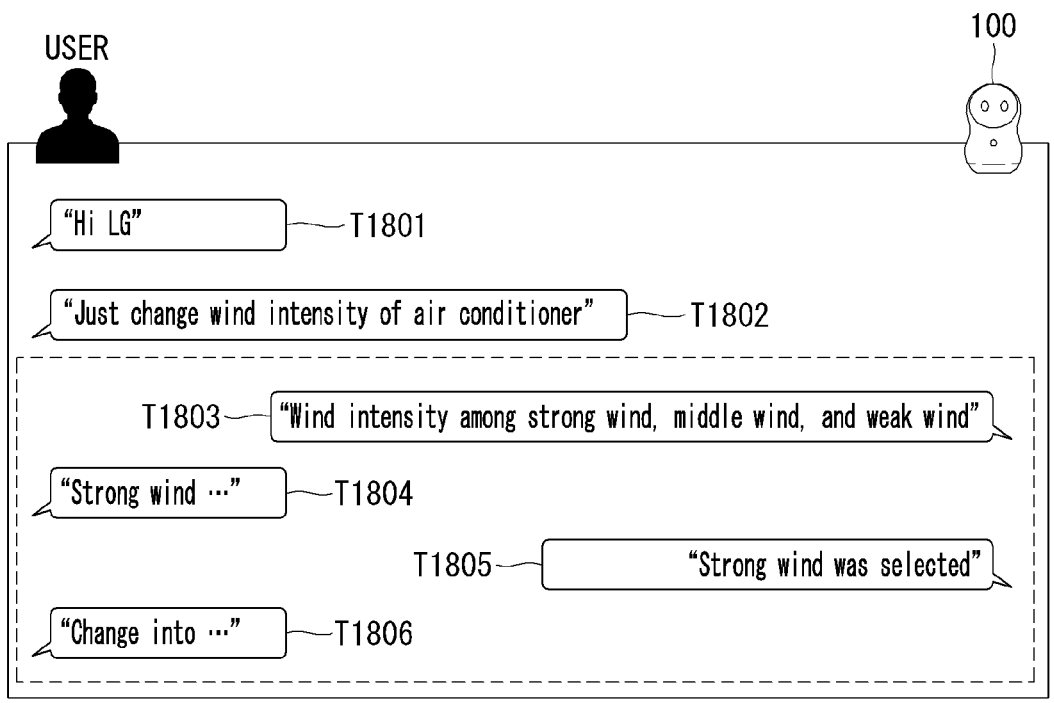

FIGS. 16 to 18 are diagrams for describing NLP in FIGS. 13 to 15.

Referring to FIG. 16, the speech processing device 100 may receive an utterance including a command (e.g., "Just show me details of spending this month in LG Pay") from a user.

The speech processing device 100 may split the command into a plurality of sub-sections. For example, the processor 110 may split the utterance into "in LG Pay (first sub-section)", "this month (second sub-section)", "spending (third sub-section)", "details (fourth sub-section)", "just (fifth sub-section)", and "show me (sixth sub-section)."

In this case, the processor 110 may specify multiple extraction sections using at least some of the multiple sub-section. For example, a first extraction section P1601 is configured with the first sub-section. A second extraction section P1602 is configured with the first and second sub-sections. A third extraction section P1603 is configured with the first to third sub-sections. A fourth extraction section P1604 is configured with first to fourth sub-sections. A fifth extraction section P1605 is configured with first to sixth sub-sections.

The processor 110 may derive reliability of intent for each of the first to fifth extraction sections P1601, P1602, P1603, P1604, and P1605. For example, the reliability of the first extraction section P1601 may be 0.02, the reliability of the second extraction section P1602 may be 0.31, the reliability of the third extraction section P1603 may be 0.52, the reliability of the fourth extraction section P1604 may be 0.61, and the reliability of the fourth extraction section P1604 may be 0.67.

As described above, in the embodiment of FIG. 16, the processor 110 may compute reliability of given intent for each of a plurality of extraction sections. However, in an embodiment of the present disclosure, reliabilities of all of intent for a plurality of extraction sections do not need to be computed. Targeted reliability of intent for some extraction sections may be derived.

Referring to FIG. 17, the speech processing device 100 may not compute reliability of intent for all of first to fifth extraction sections P1701, P1702, P1703, P1704, and P1705. The processor 110 may initiate the execution of an NLP algorithm for each of the first to fifth extraction sections P1701, P1702, P1703, P1704, and P1705. In this case, the processing time of the NLP algorithm may be determined in proportion to the range of each extraction section. Accordingly, it may be expected that the first extraction section P1701 has the shortest processing time and the fifth extraction section P1705 has the longest processing time. In one implementation example, if reliability of the third extraction section P1703 is computed as a preset reference value (e.g., 0.5) or more, the processor 110 may stop the NLP algorithm for the fourth extraction section and the fifth extraction section, which has not yet been completed. As a result, the processor 110 may generate a response to an utterance of a user based on information (intent or entity) extracted from the third extraction section P1703 among all of the first to fifth extraction sections P1701 to P1705.

FIG. 18 is a diagram for describing effects of the speech processing method of FIG. 17 according to an embodiment. Referring to FIG. 18, when a maneuvering word "Hi LG (T1801)" is received from a user, the speech processing device 100 changes its state into an activation state for NLP. When a command such as "Just change the wind intensity of the air conditioner (T1802)" is received from the user, the speech processing device 100 may output an informing message for the command.

The speech processing device 100 of FIG. 12 according to an embodiment may receive a response to an informing utterance from the user while outputting the informing utterance. For example, the speech processing device 100 may receive a response "Change into a strong wind (T1804, T1805)" from the user through the microphone. At this time, before fully receiving the response "Change into a strong wind (T1804, T1805)" from the user, the speech processing device 100 may infer the intent of the user based on the keyword "Strong wind (T1804)." If reliability in an extraction section including the keyword "Strong wind (T1804)" is a preset reference value or more, the speech processing device 100 may determine intent of the user based on some (T1804) of the entire response from the user. When the intent of the user is determined, the speech processing device 100 may output another informing utterance (e.g., "Strong wind was selected (T1805)") based on the determined intent.

As described above, the speech processing method according to an embodiment of the present disclosure may rapidly analyze intent by analyzing a dialogue between a human being and a machine, and may control to configure a dialogue sentence, such as "Cutting" or "Intrusion." That is, the speech processing method according to an embodiment of the present disclosure may configure a natural conversation sentence, such as a dialogue between human beings, even in communication between a human being and a machine.

Figure 19:
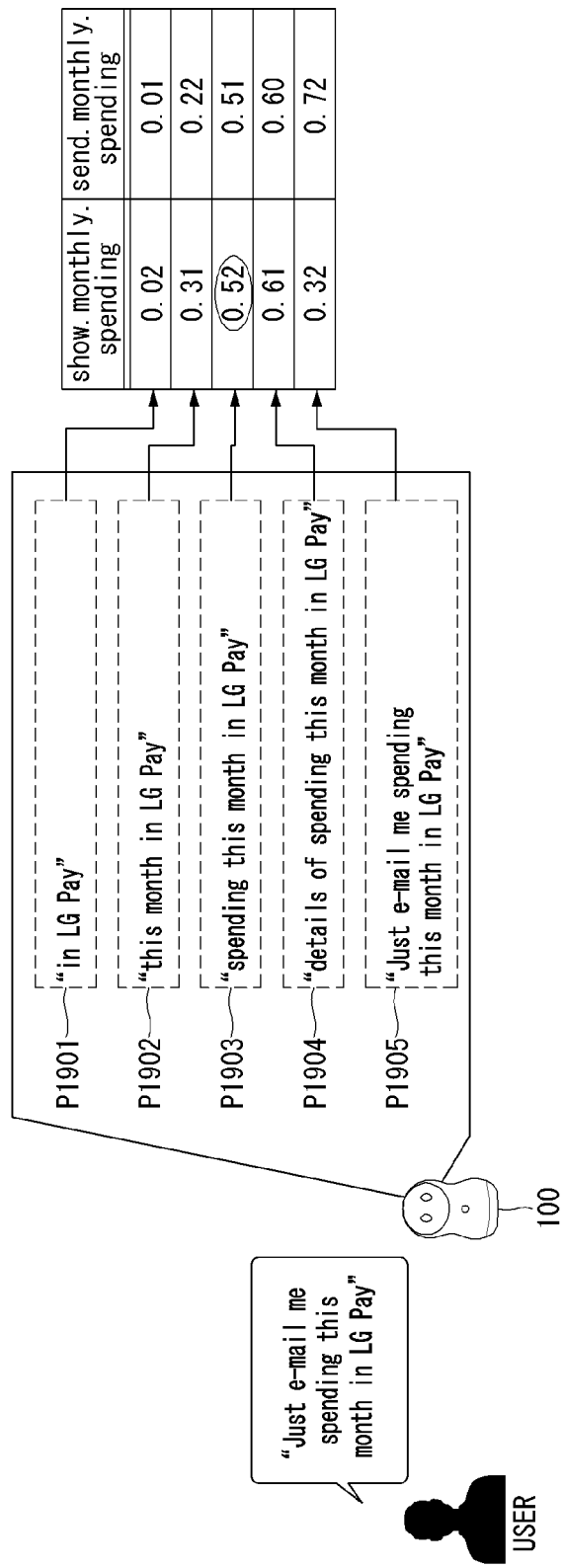
FIGS. 19 and 20 are diagrams for describing NLP in FIGS. 13 to 15.
Figure 20:
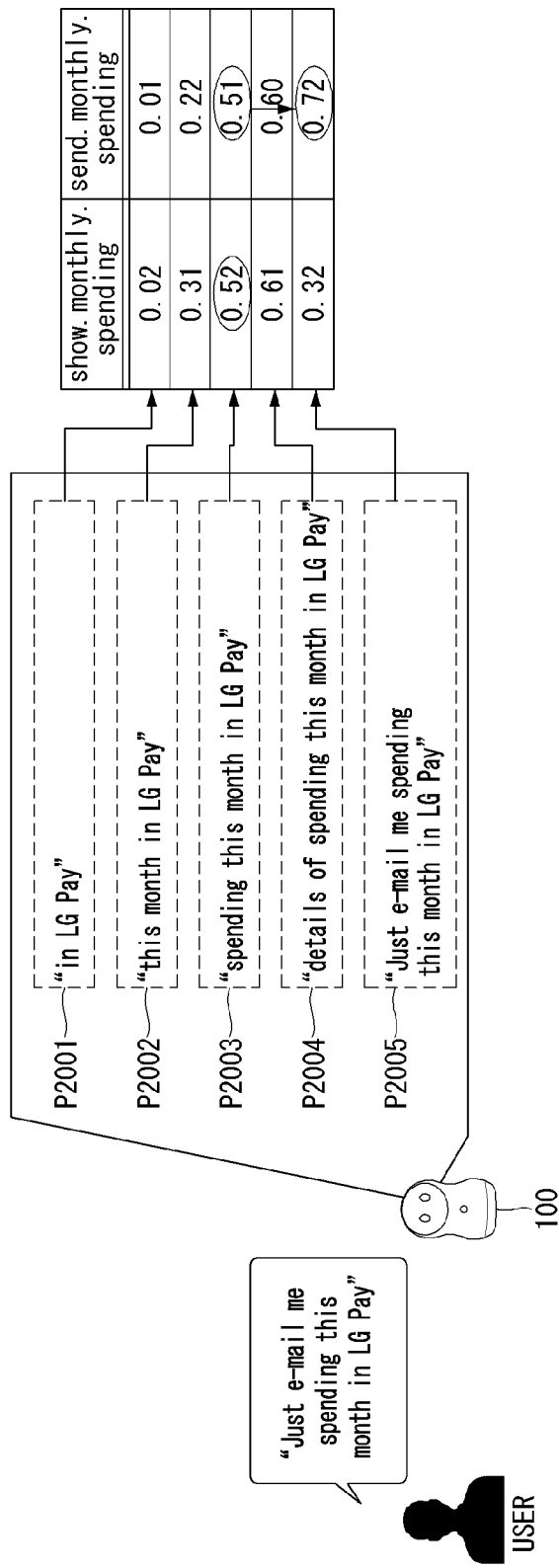

FIGS. 19 and 20 are diagrams for describing NLP in FIGS. 13 to 15.

Unlike the embodiments described with reference to FIGS. 17 and 18, the speech processing method according to an embodiment of the present disclosure may compute reliability of the remaining extraction sections although reliability having a preset reference value or more is calculated in one of multiple extraction sections.

Specifically, referring to FIG. 19, reliability of "show.monthyly.spending" in a third extraction section P1903 is computed as 0.52. In this case, the speech processing device 100 may derive results not matched with actual intent (send.montyly.spending) "Just e-mail me spending this month in LG Pay" of a user because it analyzes only the third extraction section, but does not analyze the remaining extraction sections.

Accordingly, the speech processing device 100 may analyze intent of an utterance of the user in all extraction sections, and may provide a response to the user based on a result of the analysis.

For example, although a plurality of preset reference values is set and reliability of first intent exceeding the first reference value is computed, if reliability of second intent exceeding a second reference value is computed in another extraction section, the speech processing device 100 may change a response to an utterance of a user. If NLP results based on the second intent are derived while the response based on the first intent is provided, the speech processing device 100 may output an informing message for a change of the processing results and output a response based on the changed NLP results.

Effects of the low delay voice processing system according to an embodiment of the present disclosure are described as follows.

According to the present disclosure, a natural conversation can be performed between a machine and a person.

Furthermore, according to the present disclosure, utterance intent can be inferred with respect to one utterance in parallel.

Effects which may be obtained in the present disclosure are not limited to the aforementioned effects, and other technical effects not described above may be evidently understood by a person having ordinary skill in the art to which the present disclosure pertains from the above description.

The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A speech processing method comprising:
    generating information on an activation timing of a microphone, wherein the activation timing corresponds to a time period when a first utterance is received;
    tagging utterances with the generated information in response to receiving the first utterance;
    activating the microphone by generating a signal in response to an event based at least in part on detecting that the event satisfies the activation timing while the first utterance is provided,
    receiving a second utterance through the activated microphone; and
    generating a response to the received second utterance based at least in part on extracting at least one of an intent or a subject of the second utterance, wherein generating the response further comprises:
    splitting the second utterance into an N number of sub-sections, wherein N is a first number; and
    extracting at least one of the intent or the subject from a first extraction section comprising a first sub-section to an M-th sub-section among the N sub-sections, wherein M is a second number smaller than N, wherein the response is generated based on the extracted intent or the extracted subject.

2. The speech processing method of claim 1, further comprising providing the first utterance by transmitting, to an external terminal comprising a speaker or a display, audio or text related to the first utterance.

3. The speech processing method of claim 2, wherein the microphone is activated based at least in part on controlling a transceiver to transmit the generated signal to the external terminal.

4. The speech processing method of claim 1, wherein the first utterance comprises a first informing utterance comprising guide information for multiple services stored in a memory and a second informing utterance generated based at least in part on generating the first utterance.

5. The speech processing method of claim 1, wherein generating the information on the activation timing further comprises:
    analyzing an embedding vector related to the first utterance; and
    applying the analyzed embedding vector to a neural network model and determining the activation timing corresponding to the first utterance based on an output of the neural network model.

6. The speech processing method of claim 5, wherein the neural network model is pre-trained based on log data related to a timing at which the response to the first utterance is received in association with a total output time of the first utterance.

7. The speech processing method of claim 1, further comprising providing the generated response by transmitting, to an external terminal comprising a speaker or a display, audio or text related to the provided generated response.

8. The speech processing method of claim 1,
    wherein based on a determination that a reliability of the extracted intent is less than a preset reference value, generating the response further comprises:
    extracting at least one of the intent or the subject from a second extraction section comprising the first sub-section to a P-th sub-section among the N sub-sections, wherein P is a third number that is less than or equal to N and greater than M; and
    terminating a natural language understanding process based on a determination that a reliability of the extracted intent from the second extraction section is equal to or greater than the preset reference value, wherein the response to the second utterance is generated based on the extracted intent or the extracted subject from the second extraction section.

9. The speech processing method of claim 1,
    wherein based on a determination that a reliability of the extracted intent is less than a preset reference value, generating the response further comprises extracting at least one of the intent or the subject from a third extraction section including the first sub-section to a K-th sub-section among the N sub-sections, wherein K is a number that is less than or equal to N and greater than M, and
    wherein K is increased by 1 based at least in part on a determination that a reliability of the extracted intent from the third extraction section is greater than the preset reference value.

10. The speech processing method of claim 1, further comprising controlling a transceiver to transmit the generated response to the second utterance to an external terminal comprising a speaker or a display.

11. A speech processing device comprising:
a microphone for receiving a speech signal;
a memory storing multiple first utterances; and
a processor configured to:
generate information on an activation timing of a microphone, wherein the activation timing corresponds to a time period when a first utterance is received,
tag utterances with the generated information in response to receiving the first utterance,
activate the microphone by generating a signal in response to an event when the event based at least in part on detecting that the event satisfies the activation timing while the first utterance is provided,
receive a second utterance through the activated microphone, and
generate a response to the received second utterance based at least in part on receiving at least one of intent or subject of the second utterance, wherein generating the response further comprises:
split the second utterance into an N number of sub-sections, wherein N is a first number; and
extract at least one of the intent or the subject from a first extraction section comprising a first sub-section to an M-th sub-section among the N sub-sections, wherein M is a second number smaller than N, wherein the response is generated based on the extracted intent or the extracted subject.

12. The speech processing device of claim 11, wherein the processor is further configured to provide the generated response by transmitting, to an external terminal comprising a speaker or a display, audio, or text related to the provided generated response.

13. The speech processing device of claim 11, wherein based on a determination that a reliability of the extracted intent is less than a preset reference value, generating the response further comprises:
extracting at least one of the intent or the subject from a second extraction section comprising the first sub-section to a P-th sub-section among the N sub-sections, wherein P is a third number that is less than or equal to N and greater than M; and
terminating a natural language understanding process based on a determination that a reliability of the extracted intent from the second extraction section is equal to or greater than the preset reference value, wherein the response to the second utterance is generated based on the extracted intent or the extracted subject from the second extraction section.

14. The speech processing device of claim 11, wherein based on a determination that a reliability of the extracted intent is less than a preset reference value, generating the response further comprises extracting at least one of the intent or the subject from a third extraction section including the first sub-section to a K-th sub-sections among the N sub-sections, wherein K is a number that is less than or equal to N and greater than M, and
wherein K is increased by 1 based at least in part on a determination that a reliability of the extracted intent from the third extraction section is greater than the preset reference value.

15. The speech processing device of claim 11, wherein the processor is further configured to control a transceiver to transmit the generated response to the second utterance to an external terminal comprising a speaker or a display.

16. The speech processing device of claim 13, wherein the first utterance comprises a first informing utterance comprising guide information for multiple services stored in a memory and a second informing utterance generated based at least in part on generating the first utterance.

* * * * *